United States Patent [19]

Tajima et al.

[11] Patent Number: 4,936,233
[45] Date of Patent: Jun. 26, 1990

[54] EMBROIDERING MACHINE

[75] Inventors: Ikuo Tajima; Hideo Hasegawa, both of Kasugai, Japan

[73] Assignee: Tokai Kogyo Nishin Kabushiki Kaisha, Kasugai, Japan

[21] Appl. No.: 218,743

[22] Filed: Jul. 13, 1988

[30] Foreign Application Priority Data

Jul. 14, 1987 [JP] Japan ................................. 62-173806
Jul. 30, 1987 [JP] Japan ................................. 62-188873
Oct. 13, 1987 [JP] Japan ................................. 62-256212

[51] Int. Cl.$^5$ ............................................. D05C 5/02
[52] U.S. Cl. ............................... 112/103; 112/121.12; 112/273
[58] Field of Search ...................... 112/121.12, 121.11, 112/103, 273, 278, 275, 277, 453, 457, 78, 98; 364/470

[56] References Cited

U.S. PATENT DOCUMENTS

| 4,691,648 | 9/1987 | Hirose | 112/273 |
| 4,693,196 | 9/1987 | Hager | 112/273 |
| 4,694,762 | 9/1987 | Takano et al. | 112/121.12 |

*Primary Examiner*—Peter Nerbun
*Attorney, Agent, or Firm*—Spensley Horn Jubas & Lubitz

[57] ABSTRACT

With respect to an embroidery material such as spangle which is consumed at predetermined stitches, stitch number data corresponding to a desired consumption amount of the embroidery material is previously set and the number of stitches at which the embroidery material has been supplied is counted. Whether the desired consumption amount of the embroidery material has been consumed or not is detected and the embroidering operation is controlled in accordance with the detected result. For automatically setting an embroidery start position always at a desired position in accordance with an embroidery design, the desired embroidery start position is set and stored as absolute coordinate data in correspondence to the embroidery design and positioning control is made so as to bring the embroidery frame automatically to the embroidery start position at the time of starting the embroidering operation. Various operations of the embroidering machine can be controlled by a remote control.

9 Claims, 16 Drawing Sheets

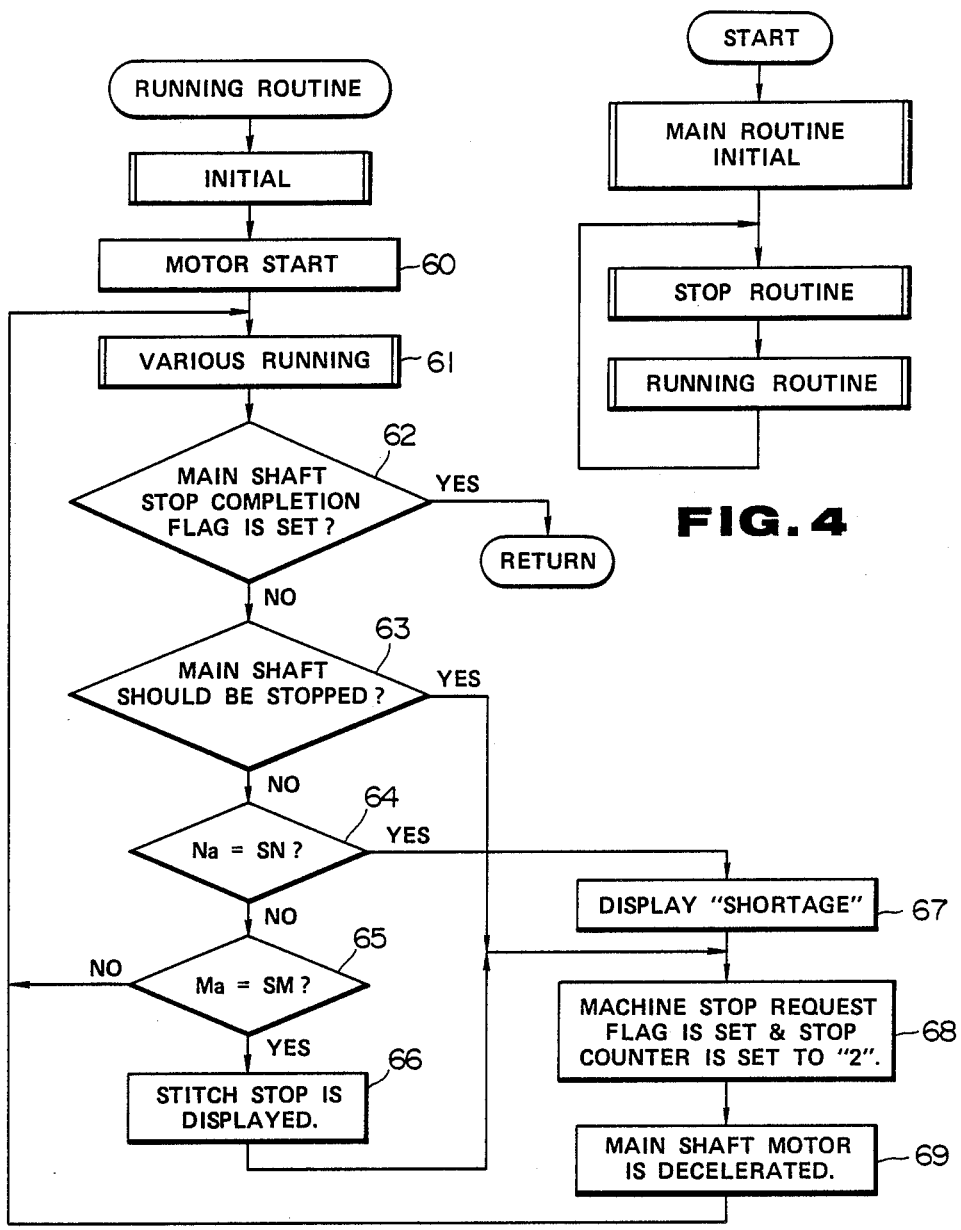

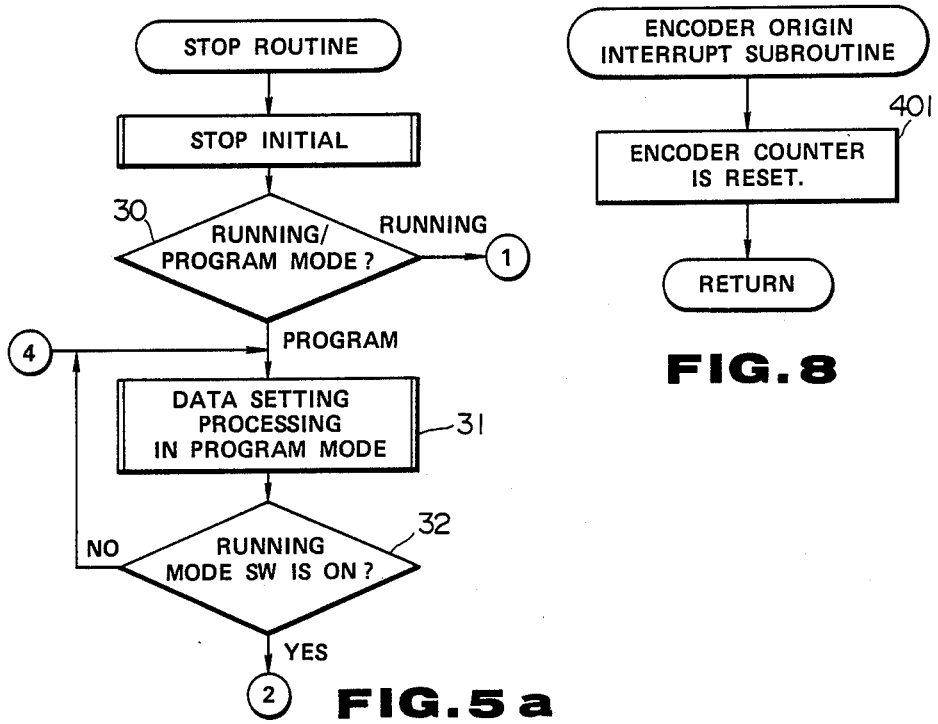
FIG. 8
FIG. 5a
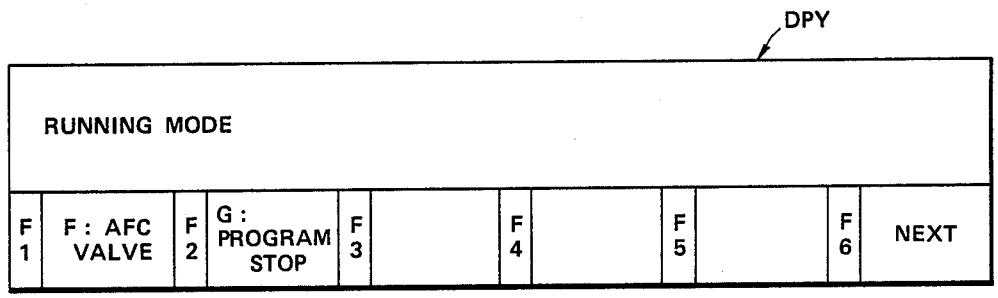
FIG. 9a
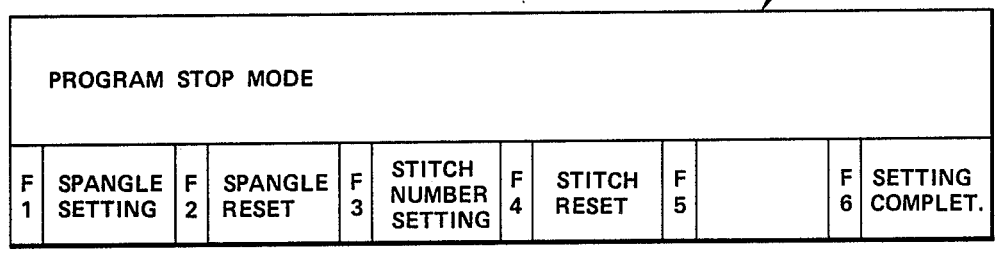
FIG. 9b

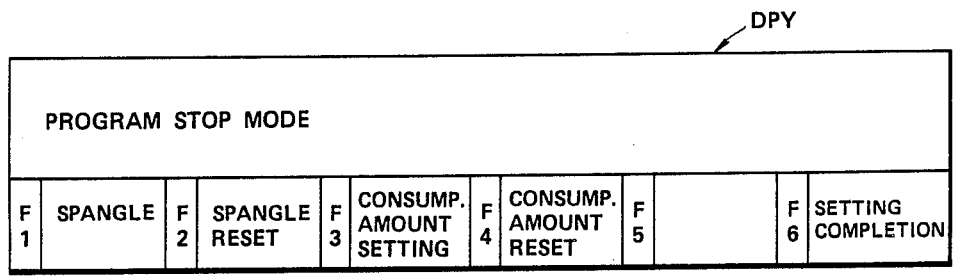
FIG.11
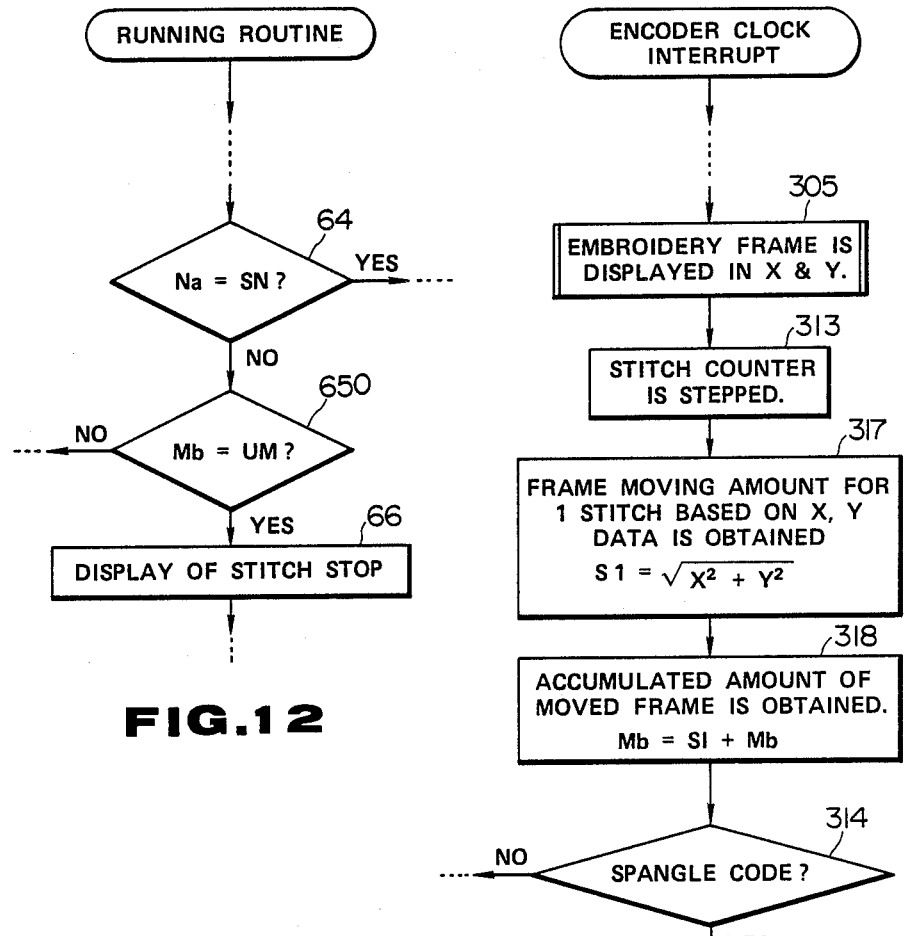
FIG.12
FIG.13

REMOTE CONTROL TRANSMITTER 111

REMOTE CONTROL RECEIVER 110

EMBROIDERING MACHINE

BACKGROUND OF THE INVENTION

This invention relates to an embroidering machine capable of detecting shortage in an embroidery material such as under thread or spangle and thereby performing a proper control such as stop of rotation of an embroidering machine main shaft.

The invention relates also to setting of an embroidery start position in an embroidering machine and positioning of an embroidery frame to the embroidery start position and, more particularly, to such setting and positioning according to which absolute coordinate data of a desired embroidery start position is manually set and inputted and stored in a memory, this absolute coordinate data of the embroidery start position is read from this memory at the start of embroidery and the embroidery frame is automatically set at the desired embroidery start position repeatedly by moving the embroidery frame to the embroidery start position corresponding to the absolute coordinate data.

Further, this invention relates to an embroidering machine capable of remote controlling an embroidering operation by operation of a remote control operation device without operating an operation panel provided on the embroidering machine.

In the conventional automatic embroidering machine, special detection means such as a sensor or a switch is provided for detecting the remaining amount of under thread stored in an under thread supply device or spangle stored in a spangle supply device. Upon detection by this detection means of exhaustion of the remaining amount of under thread stored in the under thread supply device or spangle stored in the spangle supply device, the main shaft motor of the embroidering machine is automatically stopped to supplement under thread or spangle.

The conventional embroidering machine is disadvantageous in respect of the manufacturing cost because a special sensor, switch or the like device must be provided for detecting the remaining amount of under thread or spangle.

In the conventional automatic embroidering machine, setting of a stitching operation start position of an embroidery design is made by manually moving the embroidery frame to a desired start position. In an automatic embroidering machine, current position of the embroidery frame is constantly detected by its relative position from the starting point of the embroidery and, accordingly, in a case where the same embroidery design is repeatedly embroidered, the embroidery frame can be automatically restored to an initial start position after finishing embroidery of one design even if the start position and the end position of the embroidery design are not the same whereby the same embroidery design can be embroidered repeatedly. If, however, embroidery of one embroidery design is made and then embroidery of another embroidery design is made and, again, embroidery of the first embroidery design is made, it is not possible to automatically restore the embroidery frame to the start position of the first embroidery design when the start positions of two embroidery designs are different from each other. Thus, when the embroidering operation is performed for the first embroidery design after embroidering an embroidery design of a different start position, it is necessary to mark the start position of the first embroidery design on the embroidery frame table at the starting of embroidering of the first embroidery design and move the embroidery frame manually to this marked position when the embroidery design is changed to the first embroidery design thereby to restore the embroidery frame to the start position of the first embroidery design.

In sum, in such conventional embroidering machine, in a case where, in the process of performing a repeated embroidering operation with respect to a certain embroidery design (first embroidery design), an embroidering operation of a different embroidery design (second embroidery design) which has a different start position is to be performed, the start position of the first embroidery design must be marked on the embroidery frame table with a marker or the like and, when the embroidery design has been restored from the second embroidery design to the first embroidery design and the embroidering operation is to be started again, the embroidery frame must be moved manually to the start position marked on the embroidery frame table to set the embroidering operation start position for the embroidery design. This is disadvantageous both in the work efficiency and accuracy in the embroidery operation.

In a recently developed automatic embroidering machine, patterns of embroidery designs to be embroidered tend to become large with a result that the range of embroidery surface to be embroidered expands. For this reason, when the operator performs the embroidery work while visually recognizing the embroidery design pattern on the embroidery frame under operation, substantial space is sometimes produced between the operator and the operation panel for controlling the embroidering machine. This causes difficulty for the operator in operating the operation panel while recognizing the pattern of the embroidery design and, in this case, the operator must move away from the embroidery frame under operation to the operation panel for operating the operation panel each time he wants to operate the embroidering machine.

On the other hand, since a bar switch constituting a start/stop switch is provided along the embroidery frame, the start/stop control by operation of the bar switch can be made while watching the pattern of the embroidery design on the embroidery frame. There is, however, an embroidering machine such as one having an automatic frame change function (AFC) in which the bar switch constituting the start/stop switch is not provided for structural reason. In this case, the start/stop switch is provided in a portion of the embroidering machine other than the embroidery frame such as the operation panel so that the operator must move to the portion such as the operation panel at which the start/stop switch is provided, interrupting visual recognition of the pattern of the embroidery design under operation.

In such prior art embroidering machine, since substantial space is produced between the operator and the operation panel for controlling the embroidering machine, it is very difficult for him to operate the operation panel or the start/stop switch while recognizing the pattern of the embroidery design under operation so that he must move to the operation panel or the start/stop switch away from the embroidery frame under operation. This is very troublesome and hampers accurate embroidery and efficient work.

SUMMARY OF THE INVENTION

It is, therefore, an object of the invention to provide an embroidering machine capable of detecting shortage in an embroidery material such as under thread or spangle without providing a special sensor, switch or the like device for detecting a remaining amount of the embroidery material.

It is another object of the invention to provide an embroidering machine capable of storing absolute coordinate data of a position at which embroidering of an embroidery design is started in correspondence to each embroidery design and automatically moving the embroidery frame to the embroidery start position in accordance with the stored absolute coordinate data.

It is still another object of the invention to provide an embroidery machine in which a remote control device is provided for controlling necessary operations of the embroidering machine during the embroidering work so that the operator can control the embroidering machine from a position spaced from the operation panel or the start/stop switch of the embroidering machine.

For achieving the first object of the invention, there is provided an embroidering machine storing an embroidery material in an embroidery material supply device and performing a stitching operation while supplying the embroidery material from the embroidery material supply device in synchronism with predetermined ones in stitches of an embroidery, comprising stitch number data setting means for setting stitch number data corresponding to a desired consumption amount of the embroidery material, operation means for counting, in synchronism with stitches at which the embroidery material is supplied, the number of the stitches at which the embroidery material has been supplied, and control means for controlling the stitching operation when the number of the stitches representing supply of the embroidery material which has been counted by the operation means has become equal to the number of stitches corresponding to the stitch number data set by the stitch number data setting means.

Stitch number data is previously set by the stitch number data setting means in correspondence to a desired consumption amount of the embroidery material. Upon starting of the embroidering operation by the embroidering operation execution means, the embroidery material is properly supplied from the embroidery material supply device at predetermined stitches. The operation means counts, in synchronism with stitches at which the embroidery material is to be supplied, the number of stitches at which the embroidery material is supplied. The number of stitches at which the embroidery material has actually been consumed is known from the contents of this counting. The control means controls the stitching operation when the number of stitches representing the supply of the embroidery material which has been counted by the operation means has become equal to the number of stitches corresponding to the stitch number data set by the stitch number data setting means. In this manner, whether or not a desired consumption amount of the embroidery material has actually been consumed is detected or assumed by utilizing the number of stitches and, when the desired consumption amount is assumed to have been consumed, the stitching operation is suitably controlled.

The embroidering machine achieving the first object of the invention comprises expected consumption amount data setting means for setting an expected consumption amount data corresponding to a desired consumption amount of the embroidery material, operation means for operating the embroidery frame moving amount at each stitch in synchronism with each stitch at which the embroidery material is supplied, and control means for controlling the stitching operation when an accumulated count of the embroidery frame moving amount obtained by the operation means has reached a value corresponding to the expected consumption amount data set by the expected consumption amount data setting means.

In the expected consumption amount data setting means, data corresponding to an expected consumption amount of the embroidery material (in the case of detecting, e.g., emptiness or shortage of the embroidery material, the expected consumption amount corresponds to an initially stored amount of the embroidery material in the embroidery material supply device) is previously set. Upon starting of the embroidering operation by the embroidering operation execution means, the embroidery material is supplied from the embroidery material supply device by an amount corresponding to the embroidery frame moving amount for each stitch. The operation means operates the embroidery frame moving amount in synchronism with stitches at which the embroidery material is supplied and detects the consumption amount on the basis of an accumulated value of this embroidery frame moving amount. The control means controls stitching operation in the embroidering operation execution means in accordance with the accumulated value of the embroidery frame moving amount obtained by the operation means. For example, rotation of the embroidering machine main shaft is once stopped in accordance with the remaining amount or the consumption amount of the embroidery material so as to supplement the consumed embroidery material.

For achieving the second object of the invention, there is provided an embroidering machine including stitch data memory means for storing stitch data used for realizing an embroidery operation corresponding to a desired embroidery design, means for reading the stitch data from this stitch data memory means and executing the embroidering operation by moving an embroidery frame in accordance with the read out stitch data and absolute coordinate position detection means for detecting an absolute coordinate position of the embroidery frame, said embroidering machine comprising, start position memory means for storing absolute coordinate data at a position at which stitching of the embroidery design is started in correspondence to this embroidery design, setting means for manually setting absolute coordinate data corresponding to a desired embroidery start position and causing this data to be stored in the start position memory means, and positioning control means for reading out absolute coordinate data of the embroidery start position from the start position memory means at the time of starting of the embroidery and moving the embroidery frame to an embroidery start position corresponding to this absolute coordinate data in accordance with this absolute coordinate data and current absolute coordinate position of the embroidery frame which has been detected by the absolute coordinate position detection means.

In correspondence to the embroidery design of stitch data stored in the stitch data memory means, the absolute coordinate data of the embroidery start position is manually set by the setting means and the set absolute coordinate data is stored in the start position memory means. The absolute coordinate data of the embroidery start position stored in the start position memory means is read out at the time of starting the embroidery and the embroidery frame is positioned to this embroidery start position by the positioning control means. The current position of the embroidery frame is detected by the absolute coordinate position detection means and this data is supplied to the positioning control means. The positioning control means moves the embroidery frame to the embroidery start position in accordance with the absolute coordinate data of the embroidery start position supplied from the start position memory means and data representing the current position of the embroidery frame supplied from the absolute coordinate position detection means.

Further, according to the invention, setting and inputting of a desired embroidery start position may be effected in the following manner. An already existing embroidery frame absolute coordinate position detection function is utilized as the absolute coordinate position detection means and the absolute coordinate position of the detected embroidery frame is displayed. The embroidery frame is moved to a desired embroidery start position and the absolute coordinate position of the embroidery start position is displayed by display means in the embroidery frame absolute position function. The displayed absolute coordinate data is visually recognized and the absolute coordinate data corresponding to the recognized desired embroidery start position is manually set by the setting means and stored in the start position memory means. Thereafter, the absolute coordinate data stored in the start position memory means is read out in correspondence to the embroidery design and the embroidery frame is positioned on the basis of this data. The embroidery frame can thereby be restored to the same embroidery start position corresponding to the embroidery design accurately and repeatedly any number of times.

For achieving the third object of the invention, there is provided an embroidering machine including first switches of a manual operation type for controlling various operations of the embroidering machine and control means responsive to switch operation signals produced by these switches for controlling operations of the embroidering machine corresponding to control functions assigned to the operated switches, said embroidering machine comprising a portable remote control device detachable from the embroidering machine main body comprising second switches of a manual operation type to which control functions equivalent to at least a part of the control functions of the first switches are assigned and transmission means for transmitting switch operation signals produced by these second switches, and remote control receiving means provided in the embroidering machine main body for receiving the switch operation signals of the second switches transmitted from the remote control device and supplying the received switch operation signals to the control means, said control means controlling, in response to the switch operation signals of the second switches, operations of the embroidering machine corresponding to the control functions assigned to the second switches.

By operating the manual operation type second switches in the remote control device for controlling the various operations of the embroidering machine, the operation signals of these switches are transmitted to the remote control receiving means. The remote control receiving means receives the operation signals of the switches transmitted by the remote control device and provides the received operation signals of the switches to the control means. The control means controls the embroidering operation execution means in accordance with the operation signals of the second switches.

Thus, according to the invention, operations of the embroidering machine can be controlled by operating the portable type remote control device which can be detached from the embroidering machine main body without operating the first switches mounted on the embroidering machine for controlling operations of the embroidering machine.

Embodiments of the invention will now be described in detail with reference to the accompanying drawings.

BRIEF DESCRIPTION OF THE DRAWINGS

In the accompanying drawings,

FIG. 4 is a flow chart showing an example of a main routine of a program executed by a microcomputer of FIG. 2;

FIG. 6 is a flow chart showing an example of embroidering machine main shaft running routine in the main routine of FIG. 4;

FIG. 8 is a flow chart showing an example of encoder origin interrupt subroutine executed in the embroidering machine main shaft running routine of FIG. 6;

FIG. 9 is a plan view showing an example of display by a display device in FIG. 3;

FIG. 11 is a plan view showing an example of display by the display device in one step of the processings of FIG. 10;

FIG. 12 is a flow chart showing a modified example of the running routine of FIG. 6;

FIG. 13 is a flow chart showing a modified example of the encoder clock interrupt subroutine of FIG. 7;

FIG. 17 is a flow chart showing an example of the absolute coordinate position detection subroutine of FIG. 15a;

DESCRIPTION OF PREFERRED EMBODIMENTS

Figure 1A:
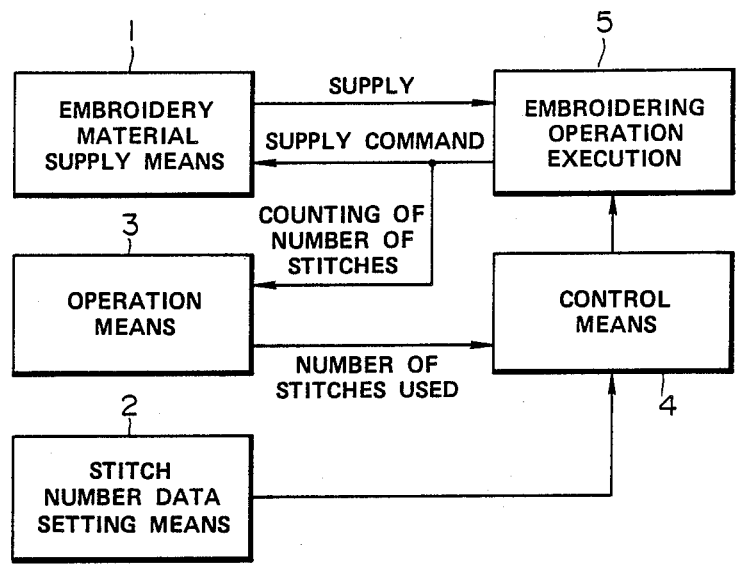
FIGS. 1a through 1d are block diagrams showing outlines of embodiments of the embroidering machine according to the invention.

The embodiment of FIG. 1a detects or assumes whether a desired amount of embroidery material has actually been consumed or not by counting the number of stitches at which the embroidery material has been supplied and thereby controls the stitching operation. An embroidery material supply device 1 stores a predetermined amount of embroidery material and, in synchronism with predetermined stitches among all stitches of the embroidery, receives a supply command from an embroidering operation execution means 5 and thereupon supplies the embroidery material. The embroidering operation execution means 5 executes the embroidering operation, consuming the supplied embroidery material. Stitch number data setting means 2 sets and inputs stitch number data in correspondence to a desired consumption amount of the embroidery material.

Upon starting of the embroidering operation by the embroidering operation execution means 5, as described above, the embroidery material is properly supplied from the embroidery material supply device 1 at predetermined stitches. Operation means 3 counts, in synchronism with stitches at which the embroidery material is to be supplied, the number of stitches at which the embroidery material is supplied. The number of stitches at which the embroidery material has actually been consumed is known from contents of this counting. Control means controls the stitching operation when the number of stitches representing supply of the embroidery material which has been counted by the operation means 3 has become equal to the number of stitches corresponding to the stitch number data set by the stitch number data setting means 2. In this manner, whether or not a desired consumption amount of the embroidery material has actually been consumed is detected or assumed by utilizing the number of stitches and, when the desired consumption amount is assumed to have been consumed, the stitching operation is suitably controlled.

By way of example, the stitch number data setting means 2 sets and inputs stitch number data in correspondence to total amount of embroidery material which is initially stored in the embroidery material supply device. In this case, when the number of stitches at which the embroidery material has been supplied, which number is obtained by the operation means 3, has become the number of stitches corresponding to the stitch number data set by the stitch number data setting means 2, it means that the embroidery material stored in the embroidery material supply device has run short. At this time, contents of the stitching operation control by the control means 4 is stopping of rotation of the embroidering machine main shaft, i.e., stopping rotation of the embroidering machine main shaft and thereby supplementing the embroidery material which has run short.

Description will be made about a case where the embroidery material is under thread. In this case, the embroidery material supply device 1 consists of an under thread supply device. The stitch number data setting means 2 previously sets and inputs stitch number data corresponding to a desired consumption amount of under thread, e.g., total amount of under thread which is is initially stored in the under thread supply device obtained by the operation means 3. Upon starting of the embroidering operation by the embroidering operation execution means 5, under thread is supplied from the under thread supply device at each stitch of the entire stitches of the embroidery. In this case, the operation means 3 counts the number of stitches at which under thread is supplied in synchronism with the entire stitches of the embroidery. When the operated number of stitches at which under thread has been supplied has become the number of stitches corresponding to the stitch number data set and inputted by the stitch number data setting means 2, the control means 4 performs the embroidering operation control such as stopping of rotation of the embroidering machine main shaft.

By way of another example, if the embroidery material is spangle, the embroidery material supply device 1 consists of spangle supply device. The stitch number data setting means 2 previously sets and inputs stitch number data corresponding to a desired consumption amount of spangles, e.g., total amount of spangles initially stored in the spangle supply device. Upon starting of the embroidering operation by the embroidering operation execution means 5, spangle is supplied only at specific stitches at which spangle should be used among respective stitches of the embroidery. In this case, the operation means 3 counts the number of stitches at which spangle has been supplied in synchronism with the specific stitches at which spangle should be used. When the operated number of stitches at which spangle has been supplied has become the number of stitches corresponding to stitch number data set and inputted by the stitch number data setting means 2, the control means 4 performs the embroidering operation control such as stopping of the embroidering machine main shaft.

Figure 1B:
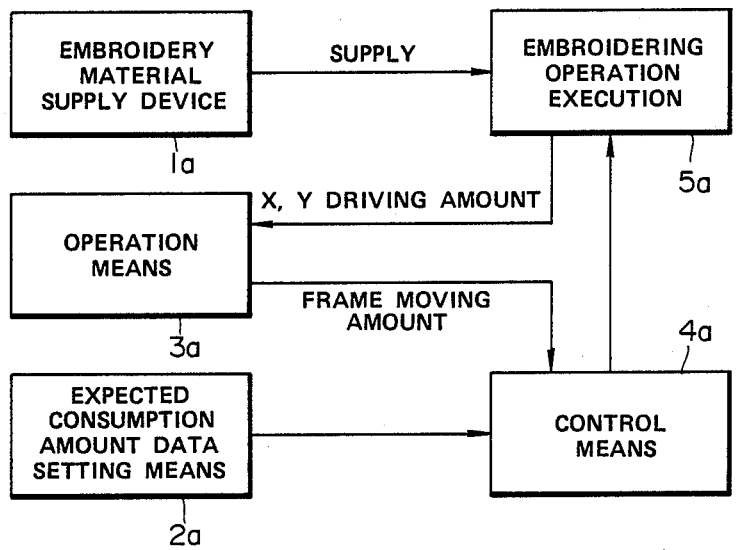

The embodiment of FIG. 1b is one in which the embroidery frame moving amount is operated in synchronism with stitches at which the embroidery material is supplied and the consumption amount of the embroidery material is detected by an accumulated value of this embroidery frame moving amount whereby the stitching operation is controlled.

Expected consumption amount data setting means 2 previously sets and inputs data corresponding to expected consumption amount of the embroidery material (in the case of detecting, e.g., emptiness or shortage of the embroidery material, the expected consumption amount corresponds to initially stored amount of the embroidery material in the embroidery material supply device). Upon starting of the embroidering operation by embroidering operation execution means 5a, the embroidery material is supplied from the embroidery material supply device 1a by an amount corresponding to the embroidery frame moving amount for each stitch. Operation means 3a operates the embroidery frame moving amount in synchronism with stitches at which the embroidery material is supplied and detects the consumption amount on the basis of an accumulated value of this embroidery frame moving amount. Control means 4a controls stitching operation in the embroidering operation execution means 5a in accordance with the accumulated value of the embroidery frame moving amount obtained by the operation means. For example, rotation of the embroidering machine main shaft is once stopped in accordance with the remaining amount or the consumption amount of the embroidery material so as to supplement the consumed embroidery material.

If, for example, the embroidery material is under thread, the embroidery material supply device 1a consists of an under thread supply device. Upon starting of the embroidering operation by the embroidering operation execution means 5a, under thread of a length corresponding to the moving amount of the embroidery frame is supplied at each stitch of the embroidery. The operation means 3a operates the moving amount of the embroidery frame at the stitch in synchronism with each stitch of the embroidery and detects the consumption amount of under thread by an accumulated value of this embroidery frame moving amount.

Figure 1C:
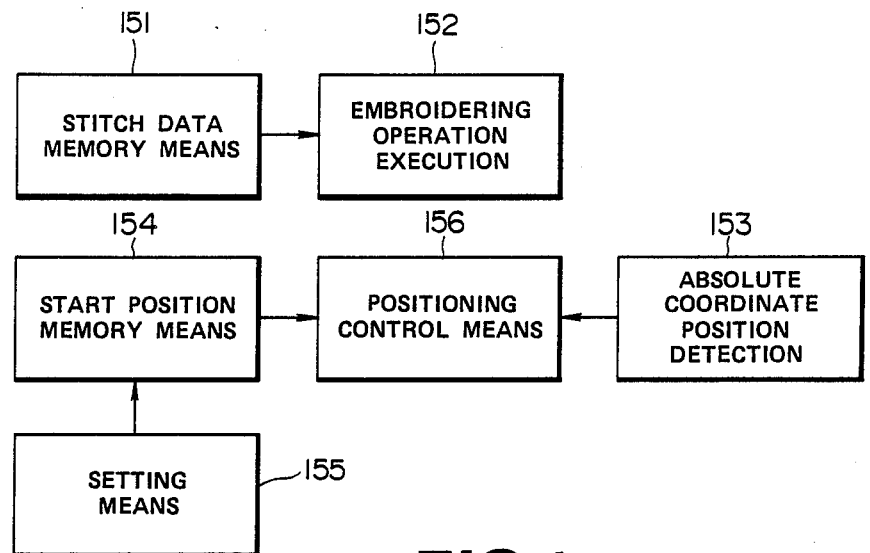

The embodiment of FIG. 1c is one in which absolute coordinate data is set at a desired embroidery start position and the embroidery frame is automatically moved to the embroidery start position at the time of starting of the embroidering operation.

Stitch data memory means 151 stores stitch data used for realizing an embroidery operation corresponding to a desired embroidery design. Embroidering operation execution means 152 reads the stitch data from the stitch data memory means 151 and executes the embroidering operation by moving an embroidery frame in accordance with the read out stitch data. Absolute coordinate position detection means 153 detects an absolute coordinate position of the embroidery frame. Start position memory means 154 stores absolute coordinate data at a position at which stitching of the embroidery design is started in correspondence to this embroidery design. Setting means 155 manually sets and inputs absolute coordinate data corresponding to a desired embroidery start position and causes this data to be stored in the start position memory means 154. Positioning control means 156 reads out absolute coordinate data of the embroidery start position from the start position memory means 154 at the time of starting of the embroidery and moving the embroidery frame to an embroidery start position corresponding to this absolute coordinate data in accordance with this absolute coordinate data and current absolute coordinate position of the embroidery frame which has been detected by the absolute coordinate position detection means 153.

The desired embroidery start position is thereby set as the absolute coordinate data and the embroidery frame can be automatically moved to the embroidery start position at the time of starting of the embroidering operation.

Setting and inputting of a desired embroidery start position may be effected in the following manner. An already existing embroidery frame absolute coordinate position detection function is utilized as the absolute coordinate position detection means 153 and the absolute coordinate position of the detected embroidery frame is displayed. The embroidery frame is moved to a desired embroidery start position and the absolute coordinate position of the embroidery start position is displayed by display means in the embroidery frame absolute position function. The displayed absolute coordinate data is visually recognized and the absolute coordinate data corresponding to the recognized desired embroidery start position is manually set and inputted by the setting means 155 and stored in the start position memory means 153. Thereafter, the absolute coordinate data stored in the start position memory means 153 is read out in correspondence to the embroidery design and the embroidery frame is positioned on the basis of this data. The embroidery frame can thereby be restored to the same embroidery start position corresponding to the embroidery design accurately and repeatedly any number of times.

Figure 1D:
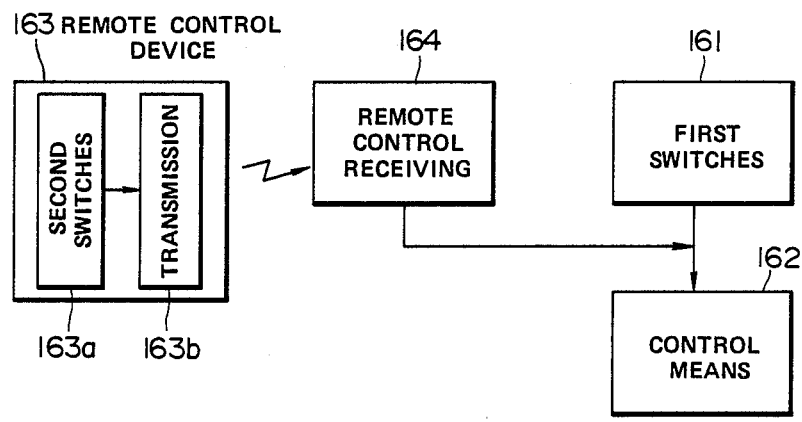

The embodiment of FIG. 1d is one in which operations of the embroidering machine are controlled by a remote control.

An embroidering machine main body includes first switches 161 of a manual operation type for controlling various operations of the embroidering machine and control means 162 responsive to switch operation signals produced by these switches for controlling operations of the embroidering machine corresponding to control functions assigned to the operated switches. A remote control device 163 comprises second switches 163a of a manual operation type to which control functions equivalent to at least a part of the control functions of the first switches 161 are assigned and transmission means 163b for transmitting switch operation signals produced by these second switches 163a. There is also remote control receiving means 164 provided in the embroidering machine main body for receiving the switch operation signals of the second switches 163a transmitted from the remote control device 163 and supplying the received switch operation signals to the control means 162. The control means controls, in response to the switch operation signals of the second switches 163a, operations of the embroidering machine corresponding to the control functions assigned to the second switches 163a.

If, for example, the remote control device 163 is a remote control transmitter employing light signal transmission having operation switches such as a start switch (means for transmitting operation signals of switches), the remote control receiving means 164 is a remote control receiver for receiving light signal. When the start switch is turned on in the remote control device 163, this operation signal is converted to a light signal and transmitted to the remote control receiving means 164. The remote control receiving means 164 converts the light signal received from the remote control device 163 to an electrical signal and provides this electrical signal to the control means 162. The control means 162 controls the embroidering operation (in this case, starting) in accordance with the operation signal of the switch.

Figure 2:
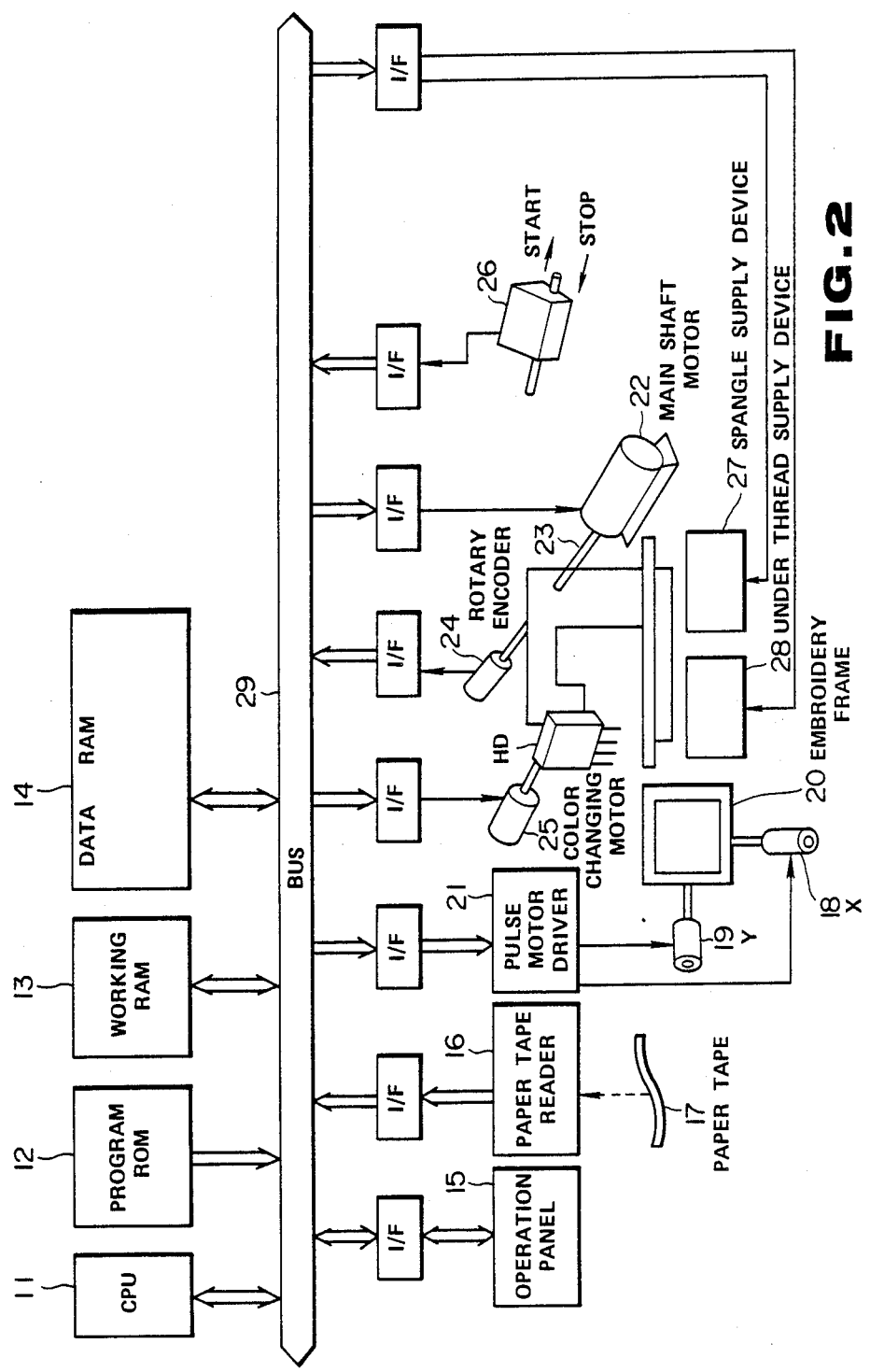
FIG. 2 is a block diagram of hardware structure schematically showing an embodiment of the automatic embroidering machine according to the invention.

FIG. 2 is a diagram showing a hardware structure of an embodiment of the control system for an automatic embroidering machine according to the invention. The operation of the entire automatic embroidering machine is controlled by a microcomputer including a CPU 11, a program ROM 12 and a working RAM 13. A data RAM 14 stores various data including stitch data for realizing a desired embroidery design and other data relating to embroidery stitching.

An operation panel 15 includes various setting switches and displays. A paper tape reader 16 reads out stitch data recorded on a paper tape (data directly relating to the embroidery operation such as X, Y data designating position of an embroidery frame for each stitch and function data designating operations of the embroidering machine including color changing, stopping of the main shaft of the machine and jump). A paper tape 17 on which stitch data for realizing a desired embroidery design is recorded is set in this paper tape reader 16. The stitch data read from this paper tape 17 through the paper tape reader 16 is transmitted to the data RAM 14 and stored therein.

An X-axis pulse motor 18 moves an embroidery frame 20 in the X-axis direction. A Y-axis pulse motor 19 moves the embroidery frame 20 in the Y-axis direction. To these pulse motors 18 and 19 are applied drive signals through a pulse motor driver 21.

A main shaft motor 22 drives a main shaft 23 of this automatic embroidering machine to be rotated. As is well known, a needle and a hook of the embroidering machine are driven in accordance with the rotation of the main shaft 23. A rotary encoder 24 detects the angle of rotation of the main shaft 23 (or motor 22).

Assuming that one stitching head HD is a multi-needle stitching head, this head HD comprises a plurality of needles (each needle being attached with thread of a different color). A color changing motor 25 causes, by its rotation, one of the plural needles of the head HD to be selected and driven by a needle drive mechanism in the head HD. The needle drive mechanism is adapted to move the needle vertically as the mahin shaft 23 is rotated. Since this needle drive mechanism is known, illustration thereof is omitted. The number of the stitching head HD is not limited to one but plural stitching heads may be provided in parallel.

A start/stop switch 26 consists of a bar switch which functions as a start switch when the bar is manipulated, e.g., in the rightward direction and function as a stop switch when the bar is manipulated, e.g., in the leftward direction. When the start switch is ON, the rotation of the main switch 23 is started and when the stop switch is ON, the rotation of the main shaft 23 is stopped.

A spangle supply device 27 supplies spangles to be sewn with thread in synchronism with the stitching operation. Spangles are not necessarily supplied in synchronism with all stitches of the stitching operation but are supplied only at specific stitches. Data for designating stitches at which spangles should be supplied is included as "spangle code" in function data in stitch data corresponding to an embroidery design stored in the data RAM 14. Initially a predetermined amount N of spangles is normally stored in the spangle supply device 27 and, when the amount of spangles in this supply device 27 has become short (i.e., empty or below a certain level), the rotation of the embroidering machine main shaft is stopped for manually supplementing a predetermined amount of spangles again.

An under thread supply device 28 supplies under thread in synchronism with the stitching operation for each stitch. A bobbin storing a predetermined amount M of under thread normally is set in the under thread supply device 28 and, when the amount of under thread in this bobbin has become short (empty or below a certain level), the rotation of the embroidering machine main shaft is stopped for replacing the under thread bobbin.

The automatic embroidering machine further comprises other devices and equipments whose illustration is omitted. The devices constituting the control system of the automatic embroidering machine deliver out and receive signals with the microcomputer through an interface I/F.

Figure 3:
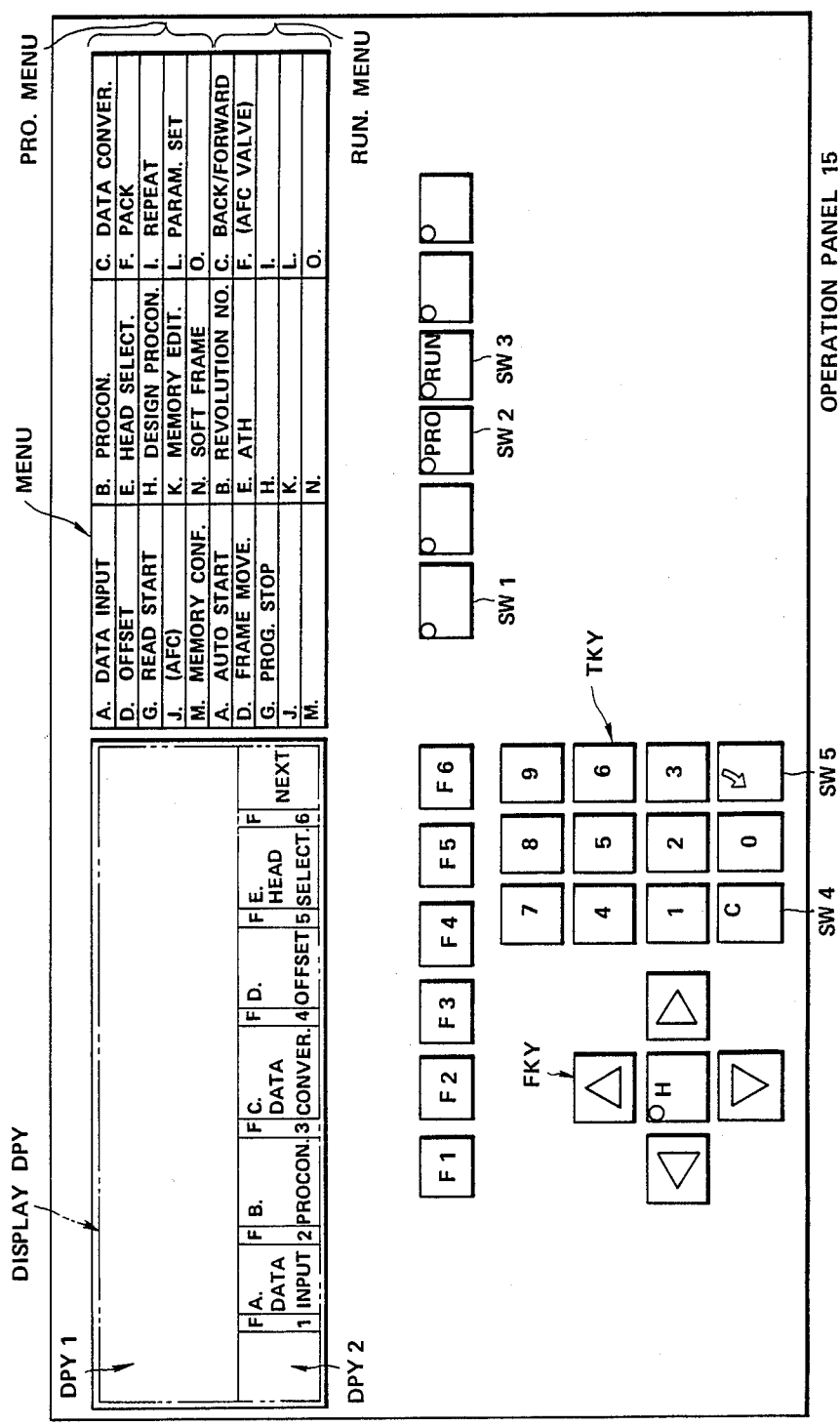
FIG. 3 is a plan view showing an example of an operation panel in FIG. 2.

An example of the switches and displays provided in the operation panel 15 is shown in FIG. 3.

A display DPY is provided for displaying data which is being set during setting of various data, displaying data which has already been set for confirmation thereof and displaying other necessary information. The display DPY is capable of displaying letters and also figures if necessary. The display DPY can be used in several display modes and, as one of such display modes, there is a display mode for setting various data or confirming contents of the set data. In this mode, as shown in FIG. 3, the display DPY functions in two sections of a set contents display section DPY1 occupying a relatively large area in the upper stage of the display DPY and a function switch explanation dispaly section DPY2 in the lower stage. A quarts display may for example be employed as this display DPY.

Six function switches F1-F6 are provided below the display DPY. The above described function switch explanation dispaly section DPY2 displays explanation about the function assigned to the respective function switches F1-F6.

Depending upon the state of assignment of the functions to the function switches F1-F6, the left side five function switches F1-F5 sometimes function as function switches corresponding to various data setting functions and the remaining switch F6 functions as a next function (NEXT) selection key. The function switch explanation display section DPY2 consists of six frames corresponding to the function switches F1-F6 and in each of the display frames corresponding to the function switches F1-F6 appears a display explaining the function which is currently assigned to the function switch (e.g., this display consists of letters "DATA INPUT" or "PROCON"). In this case, if the function switch F6 is functioning as the next function selection key, a display "NEXT" explaining the next function selection key function appears.

A function switch menu section MENU disposed on the right side of the display DPY is a list in which displays of all functions assignable to the function switches F1-F6 are visibly and fixedly displayed. This function menu section MENU consists of a program mode menu PRO.MENU and running mode menu RUN.MENU. The program mode menu PRO.MENU displays all functions assignable to the function switches F1-F6 during the program mode. The running mode menu RUN.MENU displays all functions assignable to the function switches F1- F6 during the running mode.

The program mode is a mode in which setting of various data relating to the embroidery program for realizing a desired embroidery design (e.g., inputting of data corresponding to the desired embroidery design, i.e., "DATA INPUT" or setting of the order of changing thread color, i.e., "PROCON") is performed. The running mode is a mode in which setting of running conditions (e.g,. the revolution number of the main shaft of the machine) before start of operation of the embroidering machine.

A display changeover switch SW1 is provided for switching the display mode of the display DPY. This display changeover switch SW1 is used, for example, when, as illustrated, the display mode is switched from the display mode in which the display DPY is used in the two sections of the setting contents display section DPY1 and the function switch explanation display section DPY2 to another display mode.

A program mode switch SW2 is a switch operated when the operation mode of this embroidering machine is set to the above described program mode.

A running mode switch SW3 is a switch operated when the operation mode of this embroidering machine is set to the above described running mode.

A frame moving key switch FKY is a switch operated when the embroidery frame 20 is moved by a manual operation. A ten key switch TKY is a switch operated when variious numerical data are to be inputted. A setting confirmation switch SW4 is a switch operated when contents of set data are to be confirmed in various data setting operations. A set switch SW5 is a switch operated when numerical data inputted by the ten key switch TKY is to be registered or upon completion of setting of a function and functioning as a return key.

Nextly, operations concerning the present invention among the operations executed by the automatic embroidering machine of FIG. 2 under the control of the microcomputer will be described with reference to flow charts of FIG. 4 and subsequent figures.

Upon turning on of the automatic embroidering machine, as shown in FIG. 4, the processing proceeds to embroidering machine main shaft stop routine through a predetermined initial routine. Processing operations for setting various data are executed in this main shaft stop routine. When the machine is not run, this main shaft stop routine is always carried out. When the start switch has been turned ON by operating the start/stop switch 26, the processing proceeds to running routine. In the running routine, the main shaft 23 is driven and rotated and stitch data for each one stitch is sequentially read out from the data RAM 14 in synchronism with one rotation of the main shaft and the stitching operation is carried out in accordance with the read out data.

An example of the main shaft stop routine will be described with reference to FIGS. 5a and 5b. In stop initial routine, a predetermined initializing processing during stop of the machine is executed. In next step 30, whether or not the operation mode is the running mode or the program mode is examined in accordance with the contents of an operation mode flag. The operation mode becomes the program mode by turning on of the program mode switch SW2 and the running mode by turning on of the running mode switch SW3. If the operation mode is the running mode, the processing proceeds to step 34 in which setting of various data in the running mode is performed. If the operation mode is the program mode, the processing proceeds to next step 31 in which setting of various data in the program mode is performed.

In the program mode, the display DPY first becomes a state as shown in FIG. 3 and the function switch explanation display section DPY2 displays explanation of the modes A-E in the program mode. If a next function is selected by depressing the function switch F6, the function switch explanation display DPY2 displays explanation of the modes F-J in the program mode. If the function switch F6 is depressed once again for next function, the function switch explanation display section DPY2 displays explanation of the modes K-M in the program mode. In step 31, after selecting a desired data setting item in this manner, desired data setting processing is executed and the processing proceeds to next step 32.

In step 32, whether or not the running mode switch SW3 is ON is examined. If result is NO, the processing returns to step 31 in which the processing of the program mode is repeated.

Upon turning on of the running mode switch SW3, the operation mode is switched from the program mode to the running mode. Immediately after switching to the running mode, initializing of various data is executed for starting the embroidering operations (step 33).

In next step 34, setting of various data in the running mode is executed. In the running mode, the function switch explanation display section DPY2 displays the modes A-E in the running mode (see the running mode menu RUN. MENU in FIG. 3). If a next function is selected by depressing the function switch F6, the function switch explanation display section DPY2 displays explanation of F and G modes in the running mode. The function switch explanation section DPY2 is set to a state in which a desired mode can be displayed and the desired mode is selected by operating one of hte function switches F1-F5. Desired data is set by operating the ten keys TKY or the like means.

For setting the revolution number of the embroidering machine, the function switch explanation section DPY2 is set to a state in which the menu A-E in the running mode and "revolution number mode" of B is selected by depressing the function switch F2 and a desired revolution number is set and inputted by the ten key switch TKY.

For performing the processing of the program stop mode, the function switch explanation section DPY2 is set to a state in which the menu F, G is displayed in the running mode. The display state at this time is shown in FIG. 9a. Then, the function switch F2 is depressed.

In step 35, whether or not the function switch F2 is ON is judged. When the function switch F2 has been depressed for setting "program stop mode" as described above, this step 35 becomes YES and the processing proceeds to step 36. When the function switch F2 is not ON, this step 35 becomes NO and the processing proceeds to step 46 in which other processings in the stop routine are executed.

In step 36, the display of the function switch explanation section DPY2 is switch as shown in FIG. 9b. In this step, display of functions "spangle setting", "spangle reset", "stitch number setting", "stitch reset" and "setting completion" are made in correspondence to the function switches F1-F4 and F6. F1 functions as "spangle switch" which is operated for designating setting and inputting of total stitch number data SN corresponding to total number N of spangles which are initially stored in the spangle supply device 27. F2 functions as "spangle reset switch" which is operated for resetting count Na of a spangle consumed amount counter counting accumulated amount of consumptions of spangles in the embroidering operation. F3 functions as "stitch number setting switch" which is operated for designating setting and inputting total stitch number data SM corresponding to under thread total amount M which is initially stored in the under thread supply device 28. F4 functions as "stitch reset switch" which is operated for restting under thread stitch number count Ma counting accumulated amount of consumption of under thread in the embroidering operation. F6 functions as a switch which is operated for informing the microcomputer of completion of setting processings by the function switches F1-F4 in the program stop mode.

In step 37, whether or not the function switch F1 which functions as the "spangle switch" has been turned on is examined. If the function switch F1 is ON, this step 37 becomes YES and the processing proceeds to step 38. If the function switch F1 is not ON, this step 37 becomes NO and the processing proceeds to step 39. The function switch F1 is depressed to turn it on when the total stitch number data SN corresponding to the total spangle amount N initially stored in the spangle supply device 27 is to be set and inputted.

In step 38, data SN corresponding to the predetermined total spangle amount N is set by operation of the ten key switch TKY.

In step 39, whether or not the function switch F2 which functions as the "spangle reset switch" has been turned on is examined. If the switch F2 is ON, the processing proceeds to step 40 whereas if it is not ON, the processing proceeds to step 41. For storing spangles for the first time or storing new spangles, the function switch F2 is depressed by the operator to turn it on.

In next step 40, the count Na of the spangle consumption amount counter is reset to zero and the processing proceeds to next step 41.

In step 41, whether or not the function switch F3 which functions as the "stitch number setting switch" has been turned on is examined. If the switch F3 is ON, this step 41 becomes YES and the processing proceeds to step 42. If the switch F3 is not ON, the step 41 becomes NO and the processing proceeds to step 43. The switch F3 is turned on when the stitch number data SM corresponding to the total amount M of under thread is to be set and inputted after setting newly a new under thread bobbin in the under thread supply device 28.

In step 42, the predetermined stitch number data SM is set and inputted by the operation of the ten key switch TKY.

In step 43, whether or not the function switch F4 which functions as the "stitch reset switch" has been turned on is examined. If the switch F4 is ON, this step 43 becomes YES and the processing proceeds to step 44. If the switch F4 is not ON, this step 43 becomes NO and the processing proceeds to step 45. The switch F4 is depressed to turn it on only when a new under thread bobbin is to be set in the under thread supply device 28.

In step 44, the count Ma of the under thread stitch number counter is reset to zero and the processing proceeds to next step 45.

In step 45, whether or not the function switch F6 has been turned on is examined. If the switch F6 is ON, this step 45 becomes YES and the processing proceeds to step 46. If the switch F6 is not ON, the processing returns to step 37 in which the above described routine for setting in the program stop mode is repeated. Upon completion of setting of deisred data in the program stop mode, the operator depresses the switch F6 to turn it on.

In step 46, other processings in the stop routine are executed and the processing proceeds to next step 47.

In step 47, whether or not the start/stop switch 26 is in a start switch ON state is examined. If this switch 26 is ON, the processing returns to the main routine and the processings in the running routine are executed whereas if the switch 26 is not ON, the processing proceeds to step 48.

In step 48, whether or not the program mode switch SW2 has been turned on is examined. If the switch SW2 is ON, this step 48 becomes YES and the processing returns to step 31 in which the above described routine for setting desired data in the program mode is repeated. If the switch SW2 is not ON, this step 48 becomes NO and the processing returns to step 34 in which the routine for setting desired data in the running mode is repeated.

Nextly, description will be made about operations of the running routine in the main routine in FIG. 4 with reference to the flow charts of FIG. 6 and subsequent figures.

As shown in FIG. 6, a predetermined initial processing is executed, the processing proceeds to step 60.

In step 60, the main shaft motor 22 is started.

In next step 61, various running processings for the embroidering operation are executed.

In next step 62, whether or not an embroidering machine main shaft stop completion flag is set is examined. If the flag is set, step 62 becomes YES and the processing returns to the main routine. If the flat is not set, this step 62 becomes NO and the processing proceeds to step 63.

In step 63, whether or not other conditions than those to be judged in next steps 64 and 65 have been satisfied is examined. If the start/stop switch 26 is the stop switch ON state or shortage of thread has occured, it is judged that the main shaft should be stopped. If contents of the function data are the color change code or the end code representing completion of the embroidery desing, it is judged that the main shaft should be stopped. When step 63 is YES, the processing proceeds to step 68 and when step 63 is NO, the processing proceeds to step 64.

In step 64, whether or not the count Na of the spangle consumption counter and the data SN corresponding to the total amount of spangles stored in the spangle supply device 27 have become equal to each other is examined. In other words, whether or not the amount of consumption of the spangles by the embroidering operation has become equal to the total amount N of the spangles initially stored in the spangle supply device 27 is examined. If the count Na is equal to the spangle total stitch number data SN, this step 64 becomes YES and the processing proceeds to step 67. If Na is not equal to SN (i.e., Na<SN), this step becomes NO and the processing proceeds to step 65.

In step 67, a display such as "stop for shortage of spangle" is made on the display DPY for informing the operator of shortage of the remaining amount of spangles in the spangle supply device 27. The processing then proceeds to step 68.

In step 65, whether or not the count Ma of the under thread stitch number counter and the stitch number data SM have become equal to each other is examined. In other words, whether or not the total amount of consumption of under thread in the embroidering operation has reached the total amount M of under thread initially stored in the under thread supply device 28. If the count Ma is equal to the data SM, this step 65 becomes YES and the processing proceeds to step 66. If Ma is not equal to SM (i.e., Ms<SM), this step 65 becomes NO and the processing returns to step 61 in which other running processings for the embroidering operation are repeated.

In step 66, a display such as "stop for under thread shortage" is made on the display DPY for informing the operator of shortage of under thread and then the processing proceeds to step 68.

In step 68, an embroidering machine stop request flag is set and the stop counter is set to numerical value "2" and the processing proceeds to next step 69.

In step 69, the embroidering machine main shaft motor 22 is decelerated and then the processing proceeds to step 62 in which the routine for executing various running processings is repeated.

Figure 7:
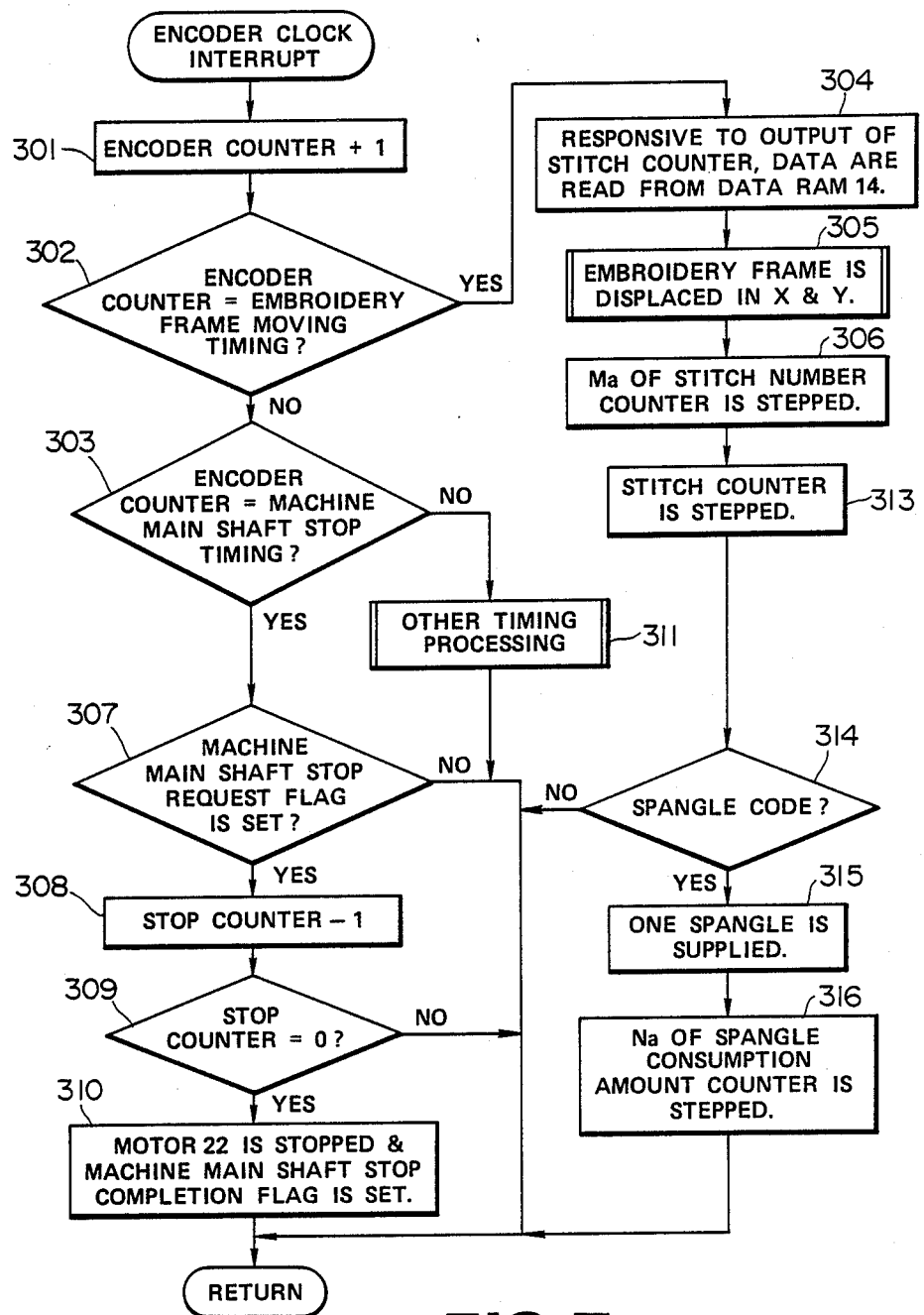
FIG. 7 is a flow chart showing an example of encoder clock interrupt subroutine executed in the embroidering machine main shaft running routine of FIG. 6.

If a clock signal is supplied from a rotary encoder 24 during the main shaft running routine, encoder clock interrupt subroutine as shown in FIG. 7 is executed.

In the encoder clock interrupt subroutine, an encoder counter is counted up by 1 (step 301) and, thereafter, which processing timing the count value corresponds to is successively judged (steps 302 and 303) and processing corresponding to the respective timings are performed. At the embroidery frame moving timing, responsive to the output of the stitch counter, X, Y data for current embroidery stitch and function data are read from the data RAM 14 (step 304) and, in accordance with the X, Y data, the embroidery frame 20 is displaced in X and Y directions (step 305) and thereafter the count value Ma of the stitch number counter is stepped and the stitch counter is stepped to next stitch (steps 306 and 313). Then, whether or not contents of the function data include a "spangle code" is examined (step 314) and, if result is NO, the processing returns to the main running routine whereas if result is YES, a command for supplying spangles is issued to the spangle supply device 27 (step 315) so that one spangle will be sewn into the embroidery design in association with the movement of the needle. Nextly, the count Na of the spangle consumption amount counter is stepped (step 316) and the processing returns to the main running routine. At the embroidering machine main shaft stop timing, whether or not the embroidering machine main shaft stop request flag is set is examined (step 307). If result is YES, the stop counter is counted down by 1 and whether or not its count has become zero is judged (steps 308 and 309). If the count has become zero, the embroidering machine main shaft motor 22 is stopped and the embroidering machine main shaft stop completion flag is set (step 310).

Jump control and other processings are executed in other embroidery timing processing (step 311).

If an origin signal is produced by the rotary encoder 24 during the processings of the embroidering machine main shaft running routine, the processings are interrupted each time this origin signal is produced and the processing proceeds to an encoder origin interrupt subroutine as shown in FIG. 8 in which the encoder counter is reset (step 401).

In the above described construction, the operation for detecting shortage of spangles stored in the spangle supply device 27 and the operation for detecting shortage of under thread in the under thread bobbin set in the under thread supply device 28 are summarized as follows:

The spangle shortage detecting operation will first be described. When spangles of a predetermined amount N are initially or newly stored in the spangle supply device 27, total stitch number data SN corresponding to this total number N of spangles is set and inputted by operation of the ten keys TKY (steps 37 and 38). Then, count Na of the spangle consumption amount counter is reset to zero for preparing for starting the embroidering operation. During the embroidering operation, a spangle is supplied at a stitch at which a spangle should be used, the stitch is designated by function data whose contents are the "spangle code" and, at a timing corresponding to the stitch, the count Na of the spangle consumption counter is stepped (steps 314–316). This Na is compared with the total stitch number data SN and the embroidering operation is repeated until Na has reached SN (steps 61–64). If the condition Na=SN has been satisfied, i.e., the accumulated amount of consumption of spangles due to the embroidering operation has reached the total amount N of spangles stored in the spangle supply device 27, the embroidering machine main shaft 23 is stopped and a display of "stop for shortage of spangle" is made in the display DPY thereby instructing the spangle supply device 27 to store spangles newly (steps 64, 67–69).

The under thread shortage detecting operation will now be described. When the under thread bobbin hsa been set initially or newly in the under thread supply device 28, total stitch number data SM corresponding to total amount M of under thread in the bobbin is set and inputted by operation of the ten keys TKY (steps 41 and 42). Then, count Ma of the under thread stitch number counter counting the accumulated amount of consumption of under thread is reset to zero for preparing for starting the embroidering operation (steps 43 and 41). Upon starting of the embroidering operation, the under thread is supplied at each of the entire stitches for the embroidery so that the count Ma is stepped in synchronism with all stitches of the embroidery (steps 305–313). This count Ma is compared with the total stitch number data SM and the embroidering operation is repeated until Ma has reached SM (steps 61–63 and 65). When the condition Ma=SM has been satisfied, i.e., the accumulated amount of consumption of under thread due to the embroidering operation has reached the total amount M of under thread in the under thread bobbin set in the under thread supply device 28, the embroidering machine main shaft 23 is stopped and a display "stop for shortage of under thread" is made in the display DPY thereby instructing the under thread supply device 28 to set a new under thread bobbin.

In the above embodiment, detection of the remaining amount of under thread in the under thread supply device 28 or detection of the remaining amount of spangles in the spangle supply device 27 is executed by a software processing by the microcomputer system. Alternatively, such detection may be processed by a hardware device provided exclusively for this purpose.

The display device for displaying causes of stopping of the embroidering machine main shaft is not limited to quartz display but an electric or electronic device such as CRT display and LED display or a hardcopy device such as a printer or a voice generation device may also be used.

In the above embodiment, up-counters are used for the spangle consumption amount counter and the under thread stitch number counter in the shortage detection means. Alternatively, down-counters which subtract values corresponding to amounts of consumption respectively from the total stitch number data SN of spangles and the total stitch number data SM of under thread respectively set and inputted in the stitch number data setting means may also be employed.

Detection of shortage of embroidery materials is not limited to detection of emptiness of the remaining amount of under thread in the under thread bobbin set in the under thread supply device 28 or of the remaining amount of spangles stored in the spangle supply device 27 but it includes detection of an amount of under thread or spangles below a certain level. Since the device is so constructed that shortage of embroidery materials is detected on the basis of the counted stitch number, the remaining amount which constitutes the basis of shortage detection need not necessarily be zero but may be variably set at a suitable value. This arrangement enables execution of supplementing of materials and other proper operations before the embroidery materials are completely exhausted so that the embroidery work can be performed without trouble and in an efficient manner.

In the above embodiment, the embroidery material whose amount of consumption is subject to detection is under thread or spangle. The embroidery material is not limited to this but various other embroidery materials such as decorating thread, tapes and beads may be subject to detection.

In the above described embodiment, the amount of consumption of embroidery materials is detected in connection with the number of stitches. Alternatively, the amount of consumption of embroidery materials may be detected in connection with the amount of actual moving of the embroidery frame.

An example of under thread consumption amount setting processing executed in the embroidering machine main shaft stop routine (FIG. 4, FIGS. 5a and 5b) will be described with reference to FIG. 10.

Figure 5:
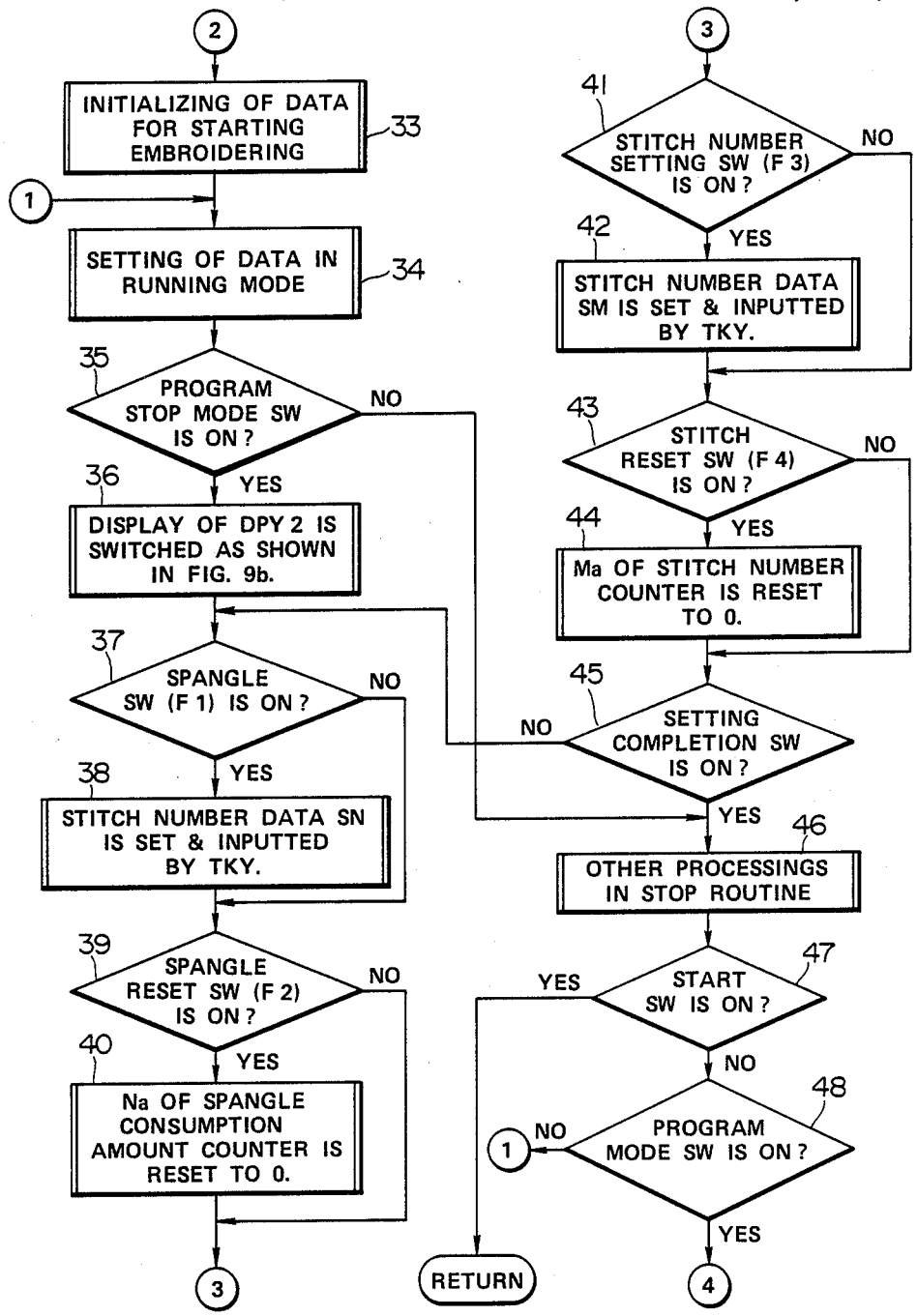
FIGS. 5a and 5b are flow charts showing an example of embroidering machine main shaft stop routine in the main routine of FIG. 4.
Figure 10:
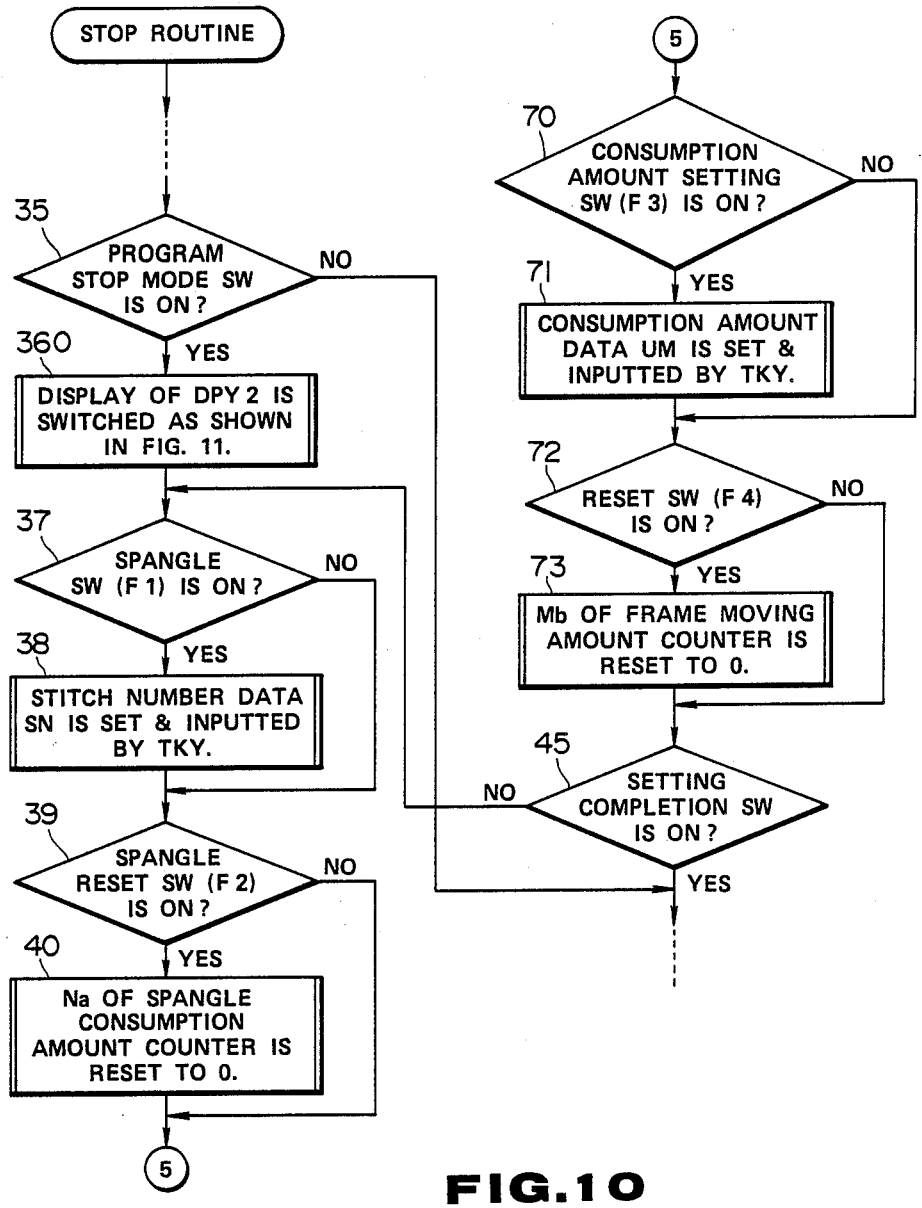
FIG. 10 is a flow chart showing another example of the embroidering machine main shaft stop routine of FIG. 5.

The processing shown in FIG. 10 can replace the processings of steps 35–45 in FIG. 5b. In the same manner as the processing described above, this processing is executed in the program stop mode in the running mode.

Upon selection of the program stop mode in the running mode, step 35 becomes YES, and the processing proceeds to step 360.

In step 360, the display in the function switch explanation section DPY2 is switched as shown in FIG. 11. In this case, function display of "spangle", "spangle reset", "consuption amount setting", "consumption amount reset" and "setting completion" are made in accordance with the function switches F1–F4 and F6. More specifically, the function switch F1 functions as the above described "spangle switch", F2 as the above described "spangle reset switch", F3 as the "consumption amount setting switch" operated for designating setting and inputting of expected consumption amount data SM corresponding to desired consumption amount of under thread in the under thread supply device 28, F4 as the "consumption amount reset switch" operated for resetting count Ma of a frame moving amount counter accumulating amount of moving of the embroidery frame for each step in the embroidering operation to zero and F6 as the switch informing the microcomputer of completion of the setting processings by the function switches F1–F4 in the program stop mode.

Processings of subsequent steps 37–40 are the same as processings in the steps designated by the same reference numerals in FIG. 5b.

In next step 70, whether or not the function switch F3 which functions as the "consumption amount setting switch" has been turned on is examined. If the switch F3 is ON, this step 70 becomes YES and the processing proceeds to step 71. If the switch F3 is not ON, this step 70 becomes NO and the processing proceeds to step 72. The switch F3 is turned on for setting and inputting consumption amount UM corresponding to desired consumption amount M of under thread.

In step 71, the desired consumption amount data UM is set and inputted by operation of the tne key switch TKY. When, for example, a new under thread bobbin is newly set in the under thread supply device 28, an amount corresponding to initial amount of under thread stored in this under thread bobbin is set and inputted as the consumption amount data UM.

In step 72, whether or not the function switch F4 functioning as the "consumption amount reset switch" has been turned on is examined. If the switch F4 is ON, this step 72 becomes YES and the processing proceeds to step 73. If the switch F4 is not ON, this step 72 becomes NO and the processing proceeds to step 45. For starting counting of consumption amount of under thread (e.g., an under thread bobbin is newly set in the under thread supply device 28), the switch F4 is depressed to turn it on.

In step 73, count Mb of the frame moving amount counter counting total moving amount of the embroidery frame 20 is reset to "0" and the processing proceeds to next step 45.

In step 45, whether or not the function switch F6 has been turned on is examined. If the switch F6 is ON, this step 45 becomes YES and the processing proceeds to step 46 (FIG. 5b). If the switch F6 is not ON, the processing returns to step 37 in which the above described routine for stting processing in the program stop mode is repeated. Upon completion of the desired data setting processing, the operator depresses the switch F6 to turn it on.

In this embodiment, the processing of step 65 of the running routine shown in FIG. 6 is changed to step 650 shown in FIG. 12. Further, steps 306 and 313 of encoder clock interrupt routine shown in FIG. 7 are changed to steps 313, 317 and 318 shown in FIG. 13.

During running of the embroidering machine, for each stitching operation, step 305 (driving of the embroidery frame) of step 305 of FIG. 13 is executed at a predetermined timing. Thereafter, contents of the stitch counter are stepped to next stitch (step 313). Then, embroidery frame moving amount SI for one stitch based on X, Y data obtained by X- Y driving the embroidery frame 20 is obtained by the formula $$SI = \sqrt{X^2 + Y^2}$$

(step 317) and the amount SI is added to the count Mb of the frame moving amount counter and the count Mb of this counter is renewed in accordance with the result of the addition (step 318).

In the meanwhile, during the running of the embroidering machine, processing of step 650 is executed for each stitching operation.

In step 650, whether or not the count Mb of the frame moving amount counter has reached the consumption amount data UM, i.e., whether or not the total amount of consumption of under thread by the embroidering operation has reaced the total amount M of under thread initially stored in the under thread supply device 28, is examined. If the condition Mb UM is satisfied, this step 650 becomes YES and the processing proceeds to step 66. If the condition Mb≧UM is not satisfied (i.e., Mb<UM), this step 650 becomes NO and the processing returns to step 61 (FIG. 6) in which other running processings concerning the embroidering operation are repeated.

In step 66, a display such as "stop for under thread shortage" is made in the display DPY to inform the operator of the shortage in the remaining amount of under thread in the under thread supply device 28. Then the processing proceeds to step 68 (FIG. 6).

In the above construction, detection of amount of consumption of under thread in the under thread bobbin set in the under thread supply device 28 or detection of shortage of under thread is summarized as follows:

When the under thread bobbin has been set for the first time or newly in the under thread supply device 28, the consumption amount data UM corresponding to desired consumption amount M of under thread in the bobbin is set and inputted by operation of the ten key switch TKY (steps 70 and 71). Then, count Mb of the moving amount counter operating total moving amount of the embroidery frame 20 corresponding to the accumulated consumption amount of under thread is reset to "0" for preparing for starting of the embroidering operation (steps 72 and 73). Upon starting of the embroidering operation, under thread of length corresponding to the moving amount of the embroidery frame 20 is supplied at each stitch of the entire stitch of the embroidering operation so that the value Mb which corresponds to the moving amount of the embroidery frame at the stitch is accumulated (steps 305, 317 and 318). This count Mb is compared with the consumption amount setting data UM (step 650) and the embroidering operation is repeated until Mb has reached UM. If the condition Mb≧UM has finally been achieved, i.e., the accumulated consumption amount of under thread for the embroidering operation has reached the total amount M of under thread in the under thread bobbin set in the under thread supply device 28, the embroidering machine main shaft 23 is stopped and a display of "stop for shortage of under thread" is made in the display DPY so as to designate setting of a new under thread bobbin in the under thread supply device 28 or taking other suitable step.

In the above described embodiment also, the detection of consumption amount of under thread in the under thread supply device 28 is executed by the software processing by the microcomputer system. This detection however may be made by using a hardware device provided exclusively for this purpose.

In the present embodiment, an upcounter is employed as the counter for counting total moving amount of the embroidery frame 20. Alternatively, a down counter subtracting a value corresponding to the moving amount of the embroidery frame 20 for each stitch in the embroidering operation from the consumption amount data UM set and inputted by the consumption amount data setting means.

Detection of shortage of embroidery material includes not only detection of emptiness of the remaining amount of under thread in the under thread bobbin set in the under thread supply device 28 but detection of an amount below a certain level. Since the shortage of embroidery material is made on the basis of the moving amount of the embroidery frame 20, the remaining amount on which the detection of shortage is based is not limited to zero but can be variously set. Therefore, supplementing or other suitable processings can be executed before the embroidery material is completely exhausted so that the embroidering operation can be performed without trouble and in an efficient manner.

In this embodiment, embroidery material whose consumption amount or remaining amount is subject to detection is under thread. The embroidery material however is not limited to under thread but other embroidery material may be subject to detection.

Nextly, description will be made about an embodiment capable of setting an embroidery start position and positioning of the embroidery frame to the embroidery start position. This embodiment is one in which absolute coordinate data of a desired embroidery start position is manually set and inputted and stored in a memory, this absolute coordinate data of the embroidery start position is read from this memory at the start of embroidery and the embroidery frame can be repeatedly automatically set at the desired embroidery start position by moving the embroidery frame to the embroidery start position corresponding to this absolute coordinate data.

In this embodiment, the data RAM 14 stores, in addition to stitch data for realizing a desired embroidery design, data of the embroidery start position.

Figure 14:
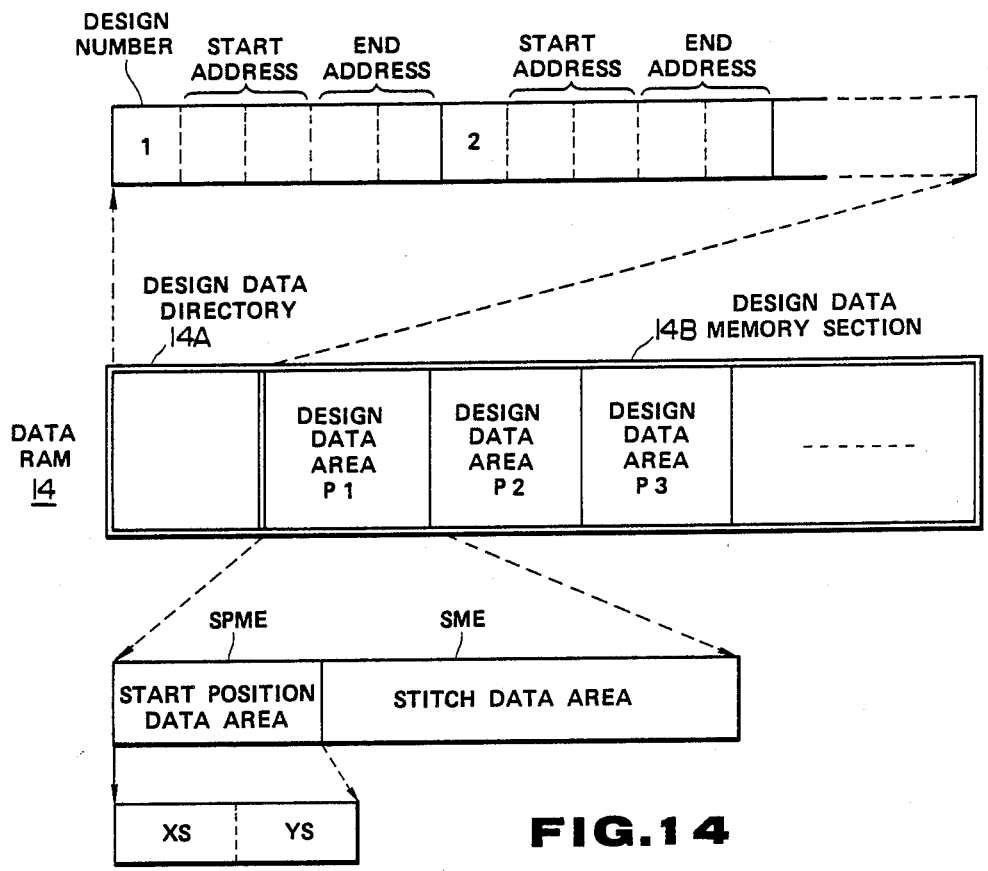
FIG. 14 is a diagram showing an example of memory map of a data RAM in FIG. 2.

FIG. 14 shows an example of a memory map of the data RAM 14. The data RAM 14 generally consists of a design data directory 14A and a design data memory section 14B. The design data memory section 14 can store design data corresponding to plural types of embroidery designs. In the design data memory section 14, design data areas P1, P2 and P3 (assuming that there are three types of registered design data) storing the respective data in correspondence to the registered design data are defined. The area in the design data memory section 14B is left blank. The design data directory 14A stores data designating memory areas of the respective registered design data in the design data memory section 14B (i.e., respective design data areas P1, P2, P3 . . . ).

The design data directory 14A stores, with respect to the respective design data areas P1, P2 and P3 registered in the design data memory section 14B, their design numbers, start address (i.e., head addresses of the areas P1, P2, P3 . . . ) and end addresses (last addresses of the areas P1, P2, P3 . . . ). The design numbers are numbers which are set as desired like "1", "2", "3", . . . for the respective areas P1, P2, P3, . . . and used for distinguishing design data which have been registered. When a desired design number has been set by data input during registration, a directory corresponding to this design number is opened in the design data directory 14A. When a desired design number has been designated by data input during reading out, the start address corresponding to this design number is read from the design data directory 14A and one of the design data areas P1, P2, P3 . . . corresponding to this design number is identified thereby and accessed to this area.

Respective design data areas P1, P2, P3, . . . consist of start position data area SPME and succeeding stitch data area SME. Stitch data area SME stores, for each stitch and over the entire stitch of one embroidery design, stitch data for realizing desired embroidering including known stitch data (data directly relating to the embroidering operation including X, Y data designating position of the embroidery frame and function data designating operations of the embroidering machine such as color change, embroidering machine main shaft stop and jump). Start position data area SPME is an area storing absolute coordinate data of embroidery start position (hereinafter referred to as start position data XS, YS, XS being data of X-axis coordinate and YS being data of Y-axis coordinate). Since the start position data area SME is provided for respective design data areas P1, P2, P3, . . . , the start position data is stored for each design.

Nextly, operations corresponding to embroidery start position setting processing among operations executed by the automatic embroidering machine of FIG. 2 under the control of the microcomputer will be described with reference to the flow charts of FIGS. 15a and 15b.

Figure 15A:
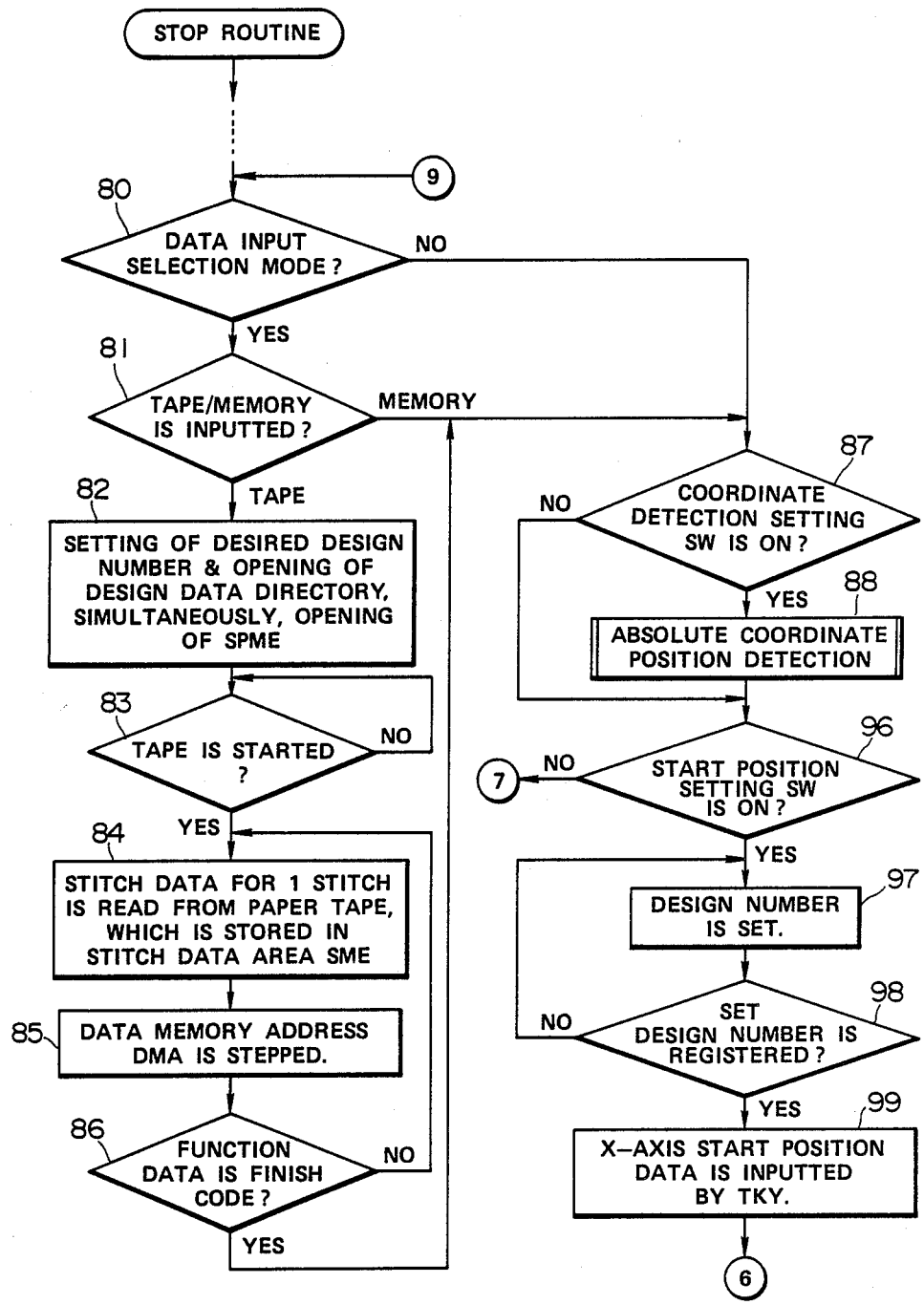
FIGS. 15a and 15b are flow charts showing another example of the embroidering machine main shaft stop routine.
Figure 15B:
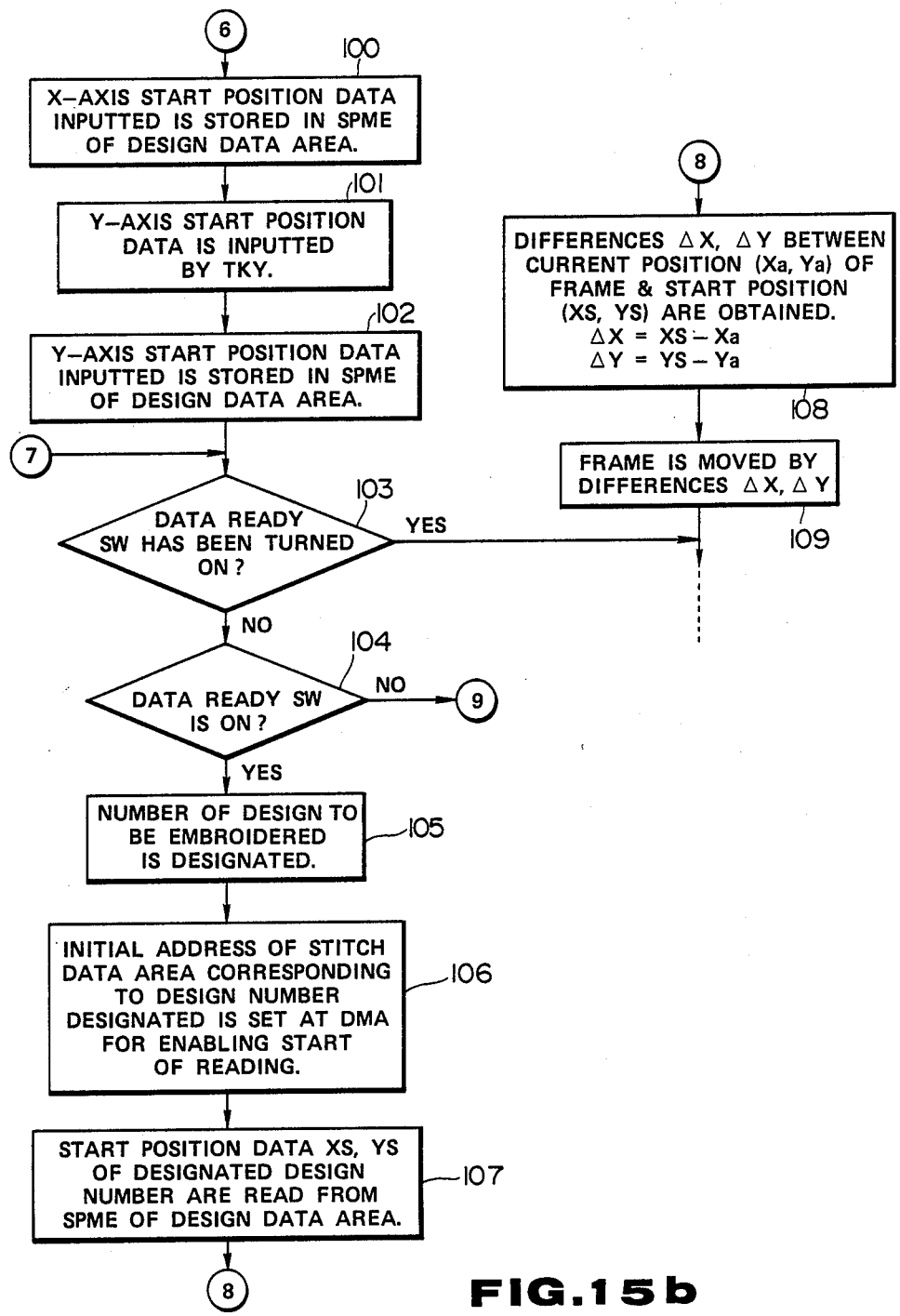

FIGS. 15a and 15b show data input setting processing which is included in step 31 shown in FIG. 5a.

In the program mode, if the function switch F1 is turned on when the function display as shown in FIG.

3 is being made by the display section DPY2, "data input setting mode" is selected and the data input setting processing shown in FIGS. 15a and 15b is executed.

Upon selection of "data input selection mode", step 80 of FIG. 15a becomes YES and the processing proceeds to step 81 in which judgement as to whether paper tape data should be loaded or reading from the design data area in the data RAM 14 should be made is performed. The selection as to whether paper tape data should be loaded or reading from the design data area in the data RAM should be performed is made by operation of the function switches F1-F6 in a condition in which contents of display in the display section DPY2 are changed to the tape/memory selection mode.

In the case of loading paper tape data, the processing first proceeds to step 82 in which setting of a desired design number and opening of a directory corresponding to the design number in the design data directory 14A are performed. The setting of the design number is made by inputting a desired number by operation of the ten key switch TKY. In this case, design numbers of registered design data and design numbers of unregistered design data are preferably displayed by the display DPY so that a desired design number will be selected from the design numbers of unregistered design data. The set and inputted design number data are stored in the design data directory 14A. Simultaneously, start address of the design data area corresponding to this design number is decided on by the computer and this start address is stored in the design data directory 14A in correspondence to the storage of the design number data. Thus, the directory corresponding to the design number which has been set and inputted is opened in the design data directory 14A. In this step 32, start position data area SPME in the design data area corresponding to the design number set and inputted (one of P1, P2, P3 . . . ) is established and contents of start position data XS, YS to be stored there are initially set to a blank state.

In next step 83, whether or not the tape start switch has been turned on is examined and standby state continues until the switch is turned on. The operator sets paper tape 17 of a desired embroidery design to the paper tape reader 16 and, upon completion of setting, he turns on the tape start switch. Upon turning on of the tape start switch, the processing proceeds to step 84. The tape start switch is provided by either assigning standby to any of the function switches F1-F6 or providing a switch for exclusive use on the operation panel 15.

In next step 84, stitch data for one stitch (X, Y data and fuuction data) recorded on the paper tape 17 is read by the paper tape reader 16 and the read stitch data for one stitch is written in the address in the data RAM 14 designated by the data memory address DMA (this is initially designated to the head address of the stitch data memory area SME corresponding to the design number).

In next step 85, the data memory address is stepped by a value for one stitch.

In next step 86, whether or not contents of the function data in stitch data read from the paper tape reader 16 in step 84 are finish code representing finish of the embroidery design is examined. If the contents of the function data are not finish code, the processing returns to step 84 in which processings of steps 84-86 which are the same as those described above are repeated with respect to next stitch.

Upon completion of loading stitch data of the entire stitch in stitch data area SME corresponding to the design number, the function code becomes the finish code and the processing proceeds to step 87.

In step 87, whether or not a switch designating a processing for detecting the absolute coordinate position of the embroidery frame 20 has been turned on is examined. If the processing for detecting the absolute position of the embroidery frame 20 is executed, the coordinate detection setting switch is turned on. If this switch is ON, the processing proceeds to absolute coordinate position detection subroutine in step 88. This coordinate detection setting switch is provided by either assigning this function to any of the function switches F1-F6 or providing a switch exclusively used for this purpose in the operation panel 15.

Figure 16:
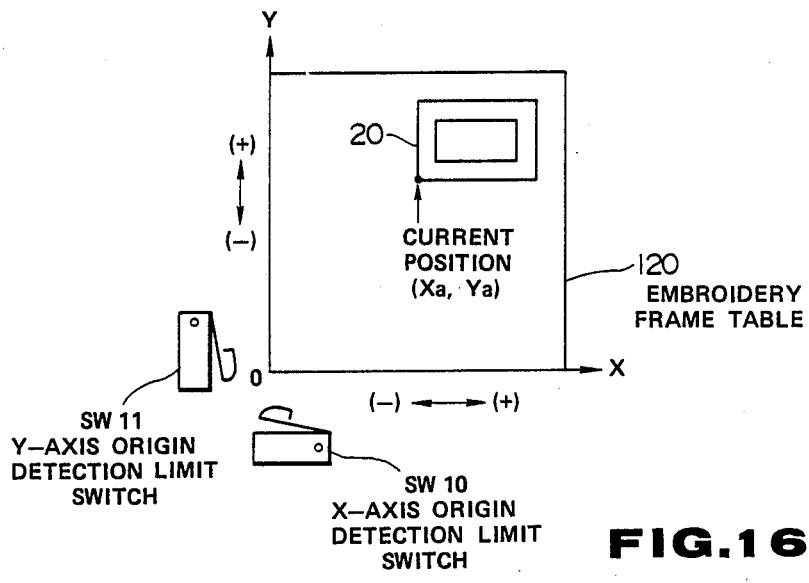
FIG. 16 is a diagram explaining the principle of the absolute coordinate position detection function of an embroidery frame.

The absolute coordinate position detection processing is a processing executed in the existing automatic embroidering machine and its principle of processing is shown in FIG. 16. As is well known, the embroidery frame 20 is mounted on a stationary embroidery frame table 120 and the embroidery frame 20 is X-Y driven relative to the table 120. At the origin of X-axis and Y-axis of the table 120 are provided an X-axis origin detection limit switch SW10 and a Y-axis origin detection limit switch SW11. If an absolute coordinate position (Xa, Ya) of the embroidery frame 20 at a desired position is to be detected, the embroidery frame 20 is moved towards the origin and stops at a position where the limit switches SW10 and SW11 are actuated (i.e., the origin). The moving amounts of the embroidery frame in the X-axis and Y-axis are counted. These counts represent the original absolute coordinate position (Xa, Ya) of the embroidery frame 20. The embroidery frame which has once moved to the origin is restored to the original position (Xa, Ya).

Figure 17:
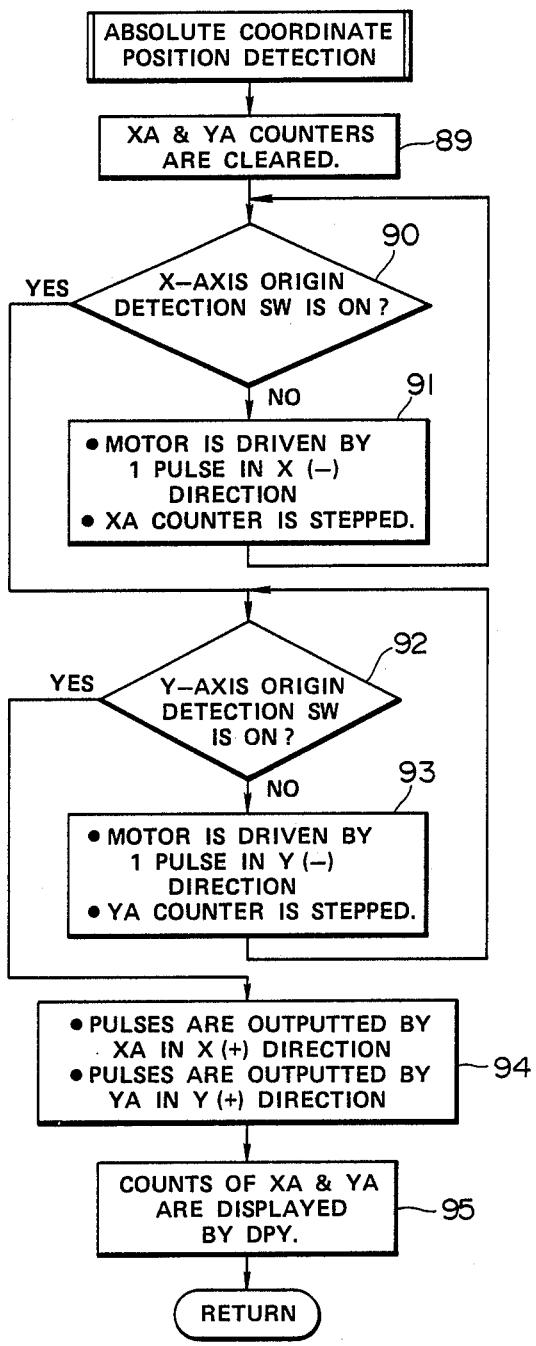

In the absolute coordinate position detection subroutine shown in FIG. 17, the above described absolute coordinate position detection processing is executed. More specifically, moving amounts of the embroidery frame 20 from the current position to the origin of the embroidery frame table 120 (X-axis=0, Y-axis=0) in X-axis and Y-axis directions are operated by employing an X-axis direction moving amount counter XA and a Y-axis direction moving amount counter YA whereby the absolute position of the embroidery frame 20 is detected.

Initially in step 89, the XA and YA counters are cleared and the processing proceeds to next step 90.

In step 90, whether or not the X-axis origin detection limit switch SW10 shown in FIG. 16 has been turned on is examined. If this switch is not ON, the processing proceeds to step 91.

In step 91, an X-axis pulse motor 18 is driven by one pulse in the negative direction for stepping of the XA counter and the processing returns to step 90. Until the embroidery frame 20 has reached the origin in the X-axis direction, i.e., until the embroidery frame 20 has been detected by the X-axis origin detection limit switch SW10, steps 90 and 99 are repeated to move the frame 20 and cause the XA counter to step at each movement of the frame 20. Upon turning on of the X-axis origin detection limit switch SW10 by the movement of the embroidery frame 20, the processing proceeds to next step 92.

In next step 92, a Y-axis pulse motor 19 is moved by one pulse in the negative direction to step the YA counter and the processing returns to step 92.

In step 93, a Y-axis pulse motor 19 is driven by one pulse in the negative direction to step the YA counter and the processing returns to step 92. Until the embroidery frame 20 has reached the origin in Y-axis direction, i.e., until the embroidery frame 20 has been detected by the Y-axis origin detection limit switch SW11, steps 92 and 93 are repeated to move the embroidery frame 20 and cause the YA counter to step at each movement of the embroidery frame 20. Upon turning on of the Y-axis origin detection limit switch SW11 by the movement of the embroidery frame 20, the processing proceeds to next step 94. At this time, counts of the respective counters XA and YA represent absolute coordinate position (Xa, Ya) of the embroidery frame 20 at the start of the absolute coordinate position detection processing.

In step 94, the X-axis pulse motor 18 is driven by counts exhibited by the XA counter in the positive direction. The Y-axis pulse motor 19 is driven by counts exhibited by the YA counter. That is, an operation is made to restore the embroidery frame 20 to the original position (Xa, Ya).

In step 95, counts of the XA and YA counters are displayed by the display DPY as the aboslute position (Xa, Ya) of the embroidery frame 20. Then the processing returns to the main routine in which step 96 of FIG. 15 is executed.

After executing this absolute coordinate detection processing, the absolute coordinate of the current position of the embroidery frame 20 can be always judged on the basis of contents of the counters XA and YA. By subsequently increasing or decreasing contents of the counters XA and YA by 1 each time the X-axis and Y-axis pulse motors 18 and 19 is driven by one pulse in the positive or negative direction, contents of the counters XA and YA can always represent the absolute coordinate of the current position of the embroidery frame 20. Alernatively, by holding contents of the counters XA and YA at the time of completion of the absolute coordinate position detection processing as they are and counting subsequent relative moving amounts of the embroidery frame 20 in X-axis and Y-axis directions by separate other counters and adding, when necessary, the contents of these other counters and the counters XA and YA to each other, data representing absolute coordinate of the current position of the embroidery frame 20 can be obtained.

Reverting to FIG. 15a, in step 96, whether or not a start position setting switch has been turned on is examined. For registering start position data, this switch is turned on and the processing proceeds to next step 51. This start position setting switch is provided by either assigning this function to one of the function switches F1-F6 or providing a switch used exclusively for this purpose.

In step 97, the design number of the embroidery design whose start position data is to be registered is set and inputted by the ten key switch TKY and the processing proceeds to next step 98.

In step 98, whether or not stitch data of the design nmber set and inputted has been registered is examined. If this is an unregistered design number, the processing returns to step 97 in which the design number is reestablished whereas if it is a registered design number, the processing proceeds to step 99.

In step 99, start position data XS of the design number in the X-axis direction is inputted by the ten key switch TKY.

In next step 100 (FIG. 15b), the start position data XS of the embroidery design in X-axis direction inputted in step 99 is registered in the start position data area SPME and the processing proceeds to next step 101.

In step 101, the start position data YS of the embroidery design in Y-axis direction is inputted by the ten key switch TKY.

In step 102, the inputted start position data YS of the embroidery design in Y-axis direction is registered in the start position data area SPME.

In step 103, whether or not a data ready switch has been turned on is examined. If this switch in ON, the processing proceeds to other processings in the stop routine whereas if this switch is not ON, the processing proceeds to step 104. This data ready switch also is provided by either assigning this function to one of the function switches or providing a switch used exclusively for this purpose in the operation panel.

In step 104, whether or not the data ready switch has been turned on is examined. If the switch is not ON, the processing returns to step 80 whereas if the switch is ON, the processing proceeds to step 105.

In step 105, the design number of a desired design to be embroidered is designated.

In next step 106, initial address of stitch data area corresponding to the design number designated by step 105 is set at the data memory address DMA thereby enabling start of reading.

In next step 107, start position data XS, YS corresponding to the designated embroidery design number are read from the position data area SPME.

In next step 108, differences $\Delta X$, $\Delta Y$ between the absolute coordinate position (Xa, Ya) of the current position of the embroidery frame 20 and the start position data XS, YS read out in the preceeding step 107 are obtained. In other words, operations $\Delta X = XS - Xa$ and $\Delta Y = YS - Ya$ are executed.

In next step 109, pulses of the number corresponding to the differences $\Delta X$ and $\Delta Y$ operated in step 108 are applied to the X-axis pulse motor 18 and the Y-axis pulse motor 19 thereby moving the embroidery frame 20 to the start position of the embroidery design.

Thereafter, other processings in the stop mode are performed.

In the above described construction, for registering the desired embroidery start position, the desired design number is first set and inputted and corresponding design stitch data is stored in the data RAM 14 (steps 82-86). The embroidery frame 20 is moved manually or by operation of a frame driving manual switch to a desired embroidery start position. Then, the absolute coordinate position detection subroutine (FIG. 17) is executed by turning on the coordinate detection setting subroutine (FIG. 17). Data of the absolute coordinate position (Xa, Ya) of the position set as desired is therby displayed by the display DPY. Upon confirming this display, the operator turns on the start position settng switch (step 96). Then, the absolute coordinate data of the embroidery start position confirmed by the display DPY is set and inputted by the ten key switch TKY and stored in the start position data area SPME as the X-axis start position data XS and Y-axis start position data YS (steps 97-102).

The number of a desired embroidery design is selected before starting the stitching operation (step 105) and start position data XS, YS are read from the start position data area corresponding to the design number (step 107) and the embroidery frame 20 is automatically positioned (steps 108 and 109). By starting running of the embroidering machine thereafter, the embroidering operation is started from the set start position (XS, YS).

As another method for setting and registering a desired embroidery start position, desired start position data XS, YS may be suitably set and inputted by operation of the ten key switch TKY instead of displaying the absolute coordinate position of a desired start position by the absolute coordinate position detection subroutine and these data may be stored in the start position data area SPME.

The start position data corresponding to each embroidery design set in the data RAM 14 and corresponding stitch data may be conserved and stored in a paper tape of the like external memory.

An embodiment capable of performing control of the embroidering machine by remote control operation will now be described.

Figure 18:
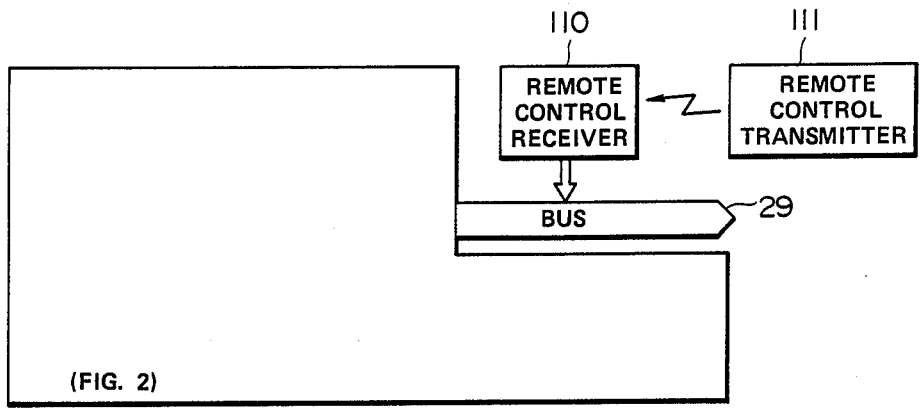
FIG. 18 is a block diagram of a hardware structure schematically showing a control system of another embodiment of the automatic embroidering machine according to the invention.

In this embodiment, as shown in FIG. 18, a remote control receiver 110 and a remote control transmitter 111 are added to the construction of FIG. 2. The remote control receiver 110 is connected to the CPU 11 (FIG. 2) through a bus 29. This remote control receiver 110 receives a light signal transmitted from the remote control transmitter 111 and converts this light signal to a digital signal for controlling the embroidering machine. The remote control receiver 110 including light receiving elements may be incorporated in the operation panel 15.

The remote control transmitter 111 is a unit separated from the embroidering machine main body and can be carried by the operator. The remote control transmitter 111 includes a remote control switch for controlling the embroidering machine and converts switch operation output signals from switches for various operations such as starting, stepping movement, stopping movement of the embroidery frame 20 in four directions (i.e., plus and minus X and plus and minus Y), ATH (thread cutting) and left and right movement for changing color of thread to light signals and transmits these light signals to the remote control receiver 110. These remote control functions enable various operations of the enbroidering machine to be controlled by a remote control operation as if operation had been made on the operation panel 15.

Figure 19:
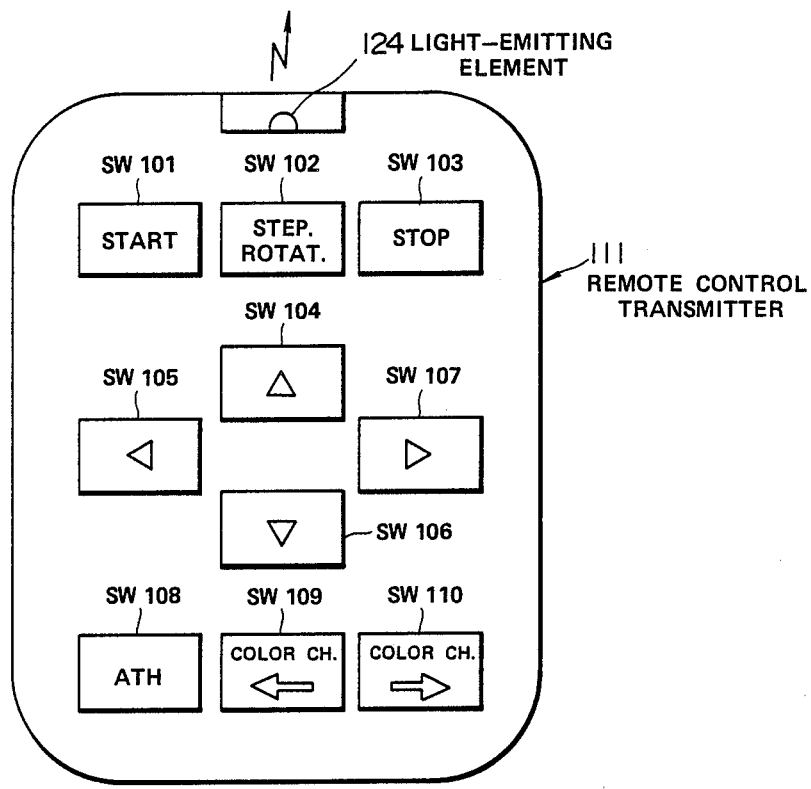
FIG. 19 is a plan view of the operation panel surface of a remote control transmitter of FIG. 18.

An example of the panel surface of the remote control transmitter 111 is shown in FIG. 19. Operation switches SW101-SW110 have functions equivalent to those of the respective corresponding switches in the operation panel 15. Upon turning on of the start switch SW101, the rotation of the embroidering machine main shaft 23 is started. The stepping switch SW102 is a switch operated to rotate the embroidering machine main shaft 23 in stepping rotation. By turning on of the switch SW102, the embroidering machine main shaft 23 can be rotated in stepping rotation. The stop switch SW103 has a function equivalent to that of the stop switch of the start/stop switch 26. By turning on of the switch SW103, the rotation of the embroidering machine main shaft 23 is stopped. The frame moving switches SW104-SW107 are switches operated when the embroidery frame 20 is moved by a manual operation and have functions equivalent to those of the frame moving key switches FKY provided on the operation panel 15. The ATH switch SW108 is a switch operated for cutting thread and a function equivalent to that of the function switch of the ATH function in the running mode menu in the operation panel 15 shown in FIG. 3. The color change switches SW109 and SW110 are switches for moving the needle case to the right or left by driving the color changing motor 25 in forward or reverse direction for selecting a needle to which thread of a desired color is attached.

Figure 20:
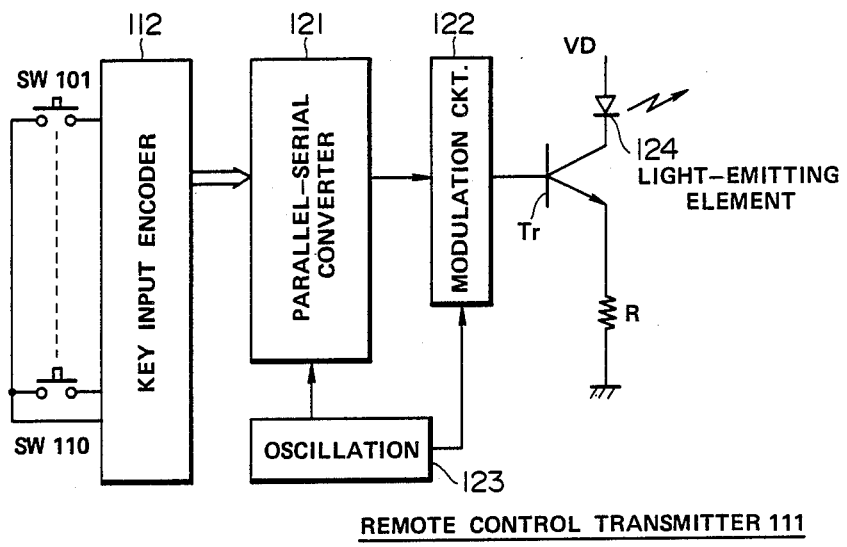
FIG. 20 is a functional block diagram of the remote control transmitter of FIG. 18.

FIG. 20 is a block diagram showing an example of the remote control transmitter 111. The operation switches SW101-SW110 are switches operated for controlling the embroidering machine and connected to a key input encoder 112. The key input encoder 112 outputs code signals representing operation switches which have been turned on among the operation switches SW101-SW110 in a parallel form. A parallel-to-serial converter 121 converts on-switch code signals provided by the key input encoder 112 to serial signals. The output serial signals are supplied to a modulation input of a modulation circuit 122. The modulation circuit 122 frequency-modulates the serial segnals supplied to the modulation input and supplies its output signal to the base of a transistor TR. The transistor Tr is a light-emitting element driver for controllong, responsive to the output signal of the modulation circuit 122, current flowing through a light-emitting element 124. The light-emitting element 124 in this example is a light-emitting diode which converts the output signal of the modulation circuit 122 which is an electric signal to a light signal. An oscillation circuit 123 supplies a serial control timing clock and a carrier wave signal to the parallel-to-serial converter 121 and the modulation circuit 122.

In FIG. 20, when a desired one of the operation switches SW101-SW110 has been turned on, a code signal corresponding to the switch is transmitted serially in the form of a light signal.

Figure 21:
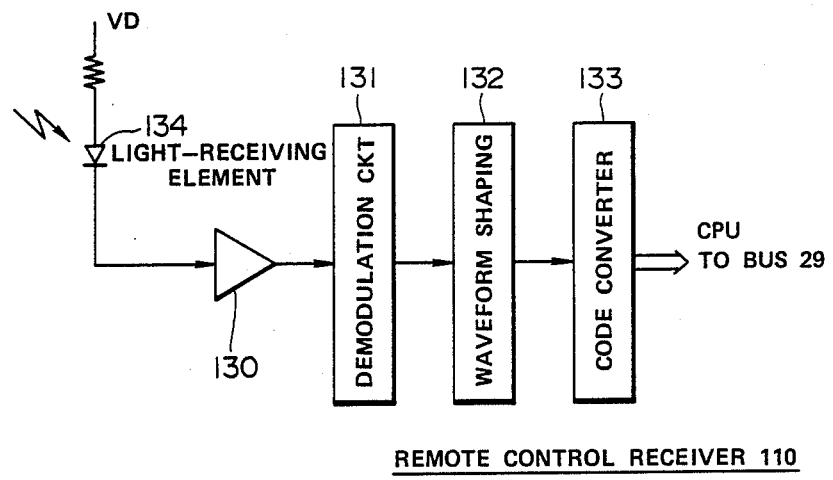
FIG. 21 is a functional block diagram of a remote control receiver of FIG. 18.

FIG. 21 is a block diagram showing an example of the remote control transmitter 110. A light-receiving element 134 in this example is a photo-diode which receives a light signal from the remote control transmitter 111 and converts it to an electric signal. To the anode of the light-receiving element 134 is applied a power voltage VD through a current limiting resistance and its cathode is connected to the input of an amplifier 130. A signal from the light-receiving element 134 is supplied to a demodulation circuit 131 for demodulation. The output of the demodulation circuit 131 is supplied to a code converter 133 through a waveform shaping circuit 132. The code converter 133 converts input seriall on-switch code signals to a parallel code signals and supplies them to a CPU bus of the embroidering machine through an interface. The code signal representing on-switch supplied to this CPU bus is read by the CPU 11 and processings responsive to the ON-operation of the switch are executed under the control of the CPU 11.

An example of the remote control operation in the embroidering work utilizing the remote control function will now be described. If, for example, the operator desires to embroider a certain embroidery design, the operator carrying the remote control transmitter 111 moves the embroidery frame 20 to a desired start position and starts the embroidering operation by turning on the start switch SW101 of the remote control transmitter 111 and thereby starting the embroidering machine main shaft 22. For changing color of thread during the embroidering work, he turns on the stop switch SW103 of the remote control transmitter 111 to stop the rotation of the embroidering machine main shaft 23 and therafter turns on the ATH switch SW108 to execute thread cutting. Then, he operates the color changing switches SW109 and SW110 to select a thread color and turns on the start switch SW101 again to start the embroidery machine main shafter 23 and thereby continue the embroidery work. Thus, according to the embroidering machine having the remote control function of the present invention, the operation can control the embroidering machine by visually watching the embroidery design on the embroidery frame 20 and, accordingly, work efficiency is improved and an accurate embroidery can be expected.

In this embodiment, a light signal is used as transmission means of the remote control device. The transmission means however is not limited to light transmission but may be other transmission means such as radio waves and cable transmission. Accordingly, functions and constructions or the remote control transmitter and receiver are not limited to the examples shown in FIGS. 19 through 21 but other construction may be employed if it has a function capable of controlling the embroidering machine by a remote control.

In this embodiment, switches having control functions corresponding to those of certain operation switches on the operation panel 15 are provided on the remote control transmitter 111 separately from the operation switches on the operation panel 15. The invention however is not limited to this. For example, a part of switches on the operation panel 15 and the switches of the remote control transmitter 111 may be constructed as common switches and these common switches may be operated as switches on the operation panel 15 and as switches which can be detached from the operation panel 15 and used as remote control switches. In this case, the remote control transmitter 111 is detachable from the operation panel 15 and the switches on the remote control transmitter 111 function as the switches of the operation panel 15 when the remote control transmitter 111 is attached to the operation panel 15 and function as the remote control switches when the remote control transmitter 111 is detached from the operation panel 15.

As described above, according to the invention, shortage of embroidery material such as under thread or spangle can be detected without providing a particular sensor, switch or the like for detecting remaining amount of the embroidery material so that the device can be simplified and the cost of manufacture can be reduced. Further, control of the embroidering operation can be made very easily on the basis of various consumption amounts by freely setting a set value of stitch number data corresponding to a desired consumption amount so that a free control can be made also during other time than during shortage of the embroidery material.

Further, according to the invention, a consumption amount of under thread etc. can be made in accordance with the embroidery frame moving amount so that an accumulated consumption amount can be accurately detected with respect to an embroidery material such as under thread of which consumption amount corresponds to the embroidery frame moving amount. Further, according to the invention, absolute coordinate data of a desired embroidery start position is manually set and inputted in correspondence to each embroidery design and stored in a memory, the absolute coordinate data of the embroidery start position is read from the memory at the time of starting of the embroidery and the embroidery frame is moved to the embroidery start position corresponding to this absolute cooridnate data so that the embroidery frame can be automatically set at the desired embroidery start position repeatedly. Accordingly, in a case where embroidery of a certain embroidery design is performed and then embroidery of a different embroidery design is performed and, again, embroidery of the first embroidery design is performed, the operator need not move the embroidery frame manually to the start positions of the respective embroidery designs eac time the embroidery design is changed. Besides, the troublesome work of marking the start positions of the respective embroidery designs on the embroidery frame table with a marker or the like is obviated so that the efficiency of the embroidery work is improved and an accurate positioning of an embroidery start position can be expected.

Furthermore, according to the invention, a remote control device is provided for enabling control of the embroidering machine during the embroidery work so that the operator can control the embroidering machine even when he is in a position spaced from the operation panel or the start/stop switch. Accordingly, he can control the embroidering machine by remote control by visually recognizing the embroidery design under operation so that the efficiency of the embroidery work is improved and an accurate embroidery can be expected.

What is claimed is:

1. An embroidery machine storing an embroidery material in an embroidery material supply device and performing a stitching operation while supplying the embroidery material from the embroidery material supply device in synchronism with predetermined stitches of an embroidery, comprising:

stitch number data setting means for setting stitch number data corresponding to a desired consumption amount of the embroidery material;

operation means for counting, in synchronism with stitches at which the embroidery material is supplied, the number of stitches at which the embroidery material has been supplied, wherein when the embroidery material is supplied only at specific stitches of the embroidery, the number of specific stitches being less than a number of total stitches of the embroidery, the operation means counts the number of stitches at which the embroidery material has been supplied in synchronism with the specific stitches; and control means for controlling the stitching operation when the number of stitches representing supply of the embroidery material which has been counted by the operation means has become equal to the number of stitches corresponding to the stitch number data set by the stitch number data setting means.

2. An embroidery machine as defined in claim 1 wherein said control means performs a control for stopping rotation of an embroidering machine main shaft.

3. An embroidering machine storing an embroidering material in an embroidering material supply device and performing a stitching operation while supplying, in synchronism with each stitch of an embroidery, the embroidering material from the embroidery material supply device by an amount substantially corresponding to an embroidery frame moving amount at a stitch, comprising:

expected consumption amount data setting means for setting expected consumption amount data corresponding to a desired consumption amount of the embroidery material;

operation means for accumulating an absolute value of the embroidery frame moving amount at each stitch in synchronism with each stitch at which the embroidery material is supplied; and control means for controlling the stitching operation when an accumulated count of the embroidery frame moving amount obtained by the operation means has reached a value corresponding to the expected consumption amount data setting means.

4. An embroidering machine as defined in claim 3 wherein the embroidery material is under thread and said embroidery material supply device is an under thread supply device.

5. An embroidering machine as defined in claim 3 wherein said control means performs a control for stopping rotation of an embroidering machine main shaft.

6. An embroidering machine storing an embroidery material in an embroidery material supply device and performing a stitching operation while supplying, in synchronism with each stitch of an embroidery, the embroidery material from the embroidery material supply device by an amount substantially corresponding to an embroidery frame moving amount at a stitch, comprising:

operation means for accumulating, in synchronism with each stitch at which the embroidery material is supplied, an absolute value of the embroidery frame moving amount at said each stitch and;

means for detecting a consumption amount of the embroidery material from the embroidery frame moving amount accumulated by said operation means.

7. An embroidery machine, comprising:

stitch data memory means for storing stitch data for plural embroidery designs, said stitch data comprising data for executing a corresponding embroidery operation for each of said plural embroidery designs;

means for reading stitch data from said stitch data memory means and executing an embroidering operation by moving an embroidery frame in accordance with read out stitch data;

means for detecting an absolute coordinate position of the embroidery frame relative to a reference point;

start position memory means for storing absolute coordinate data for a desired embroidery start position at which stitching of the embroidery design is to be started for each of said plural embroidery designs;

setting means for manually setting absolute coordinate data corresponding to the desired embroidery start position for each of said plural embroidery designs and causing this data to be stored in the start position memory means; and positioning control means for selectively reading out absolute coordinate data of a designated desired embroidery start position from the start position memory means at the time of starting of an embroidery and moving the embroidery frame to an embroidery start position corresponding to the absolute coordinate data in accordance with the absolute coordinate data and current absolute coordinate position of the embroidery frame which has been detected by the absolute coordinate position detection means.

8. An embroidering machine including first switches of a manual operation type for controlling various operations of the embroidering machine and control means responsive to switch operation signals produced by these switches for controlling operations of the embroidering machine corresponding to control functions assigned to the operated switches, comprising:

a portable remote control device detachable from the embroidering machine main body comprising second switches of a manual operation type to which control functions equivalent to at least a part of the control functions of the first switches are assigned and transmission means for transmitting switch operation signals produced by these second switches; and remote control receiving means provided in the embroidering machine main body for receiving the switch operation signals of the second switches transmitted from the remote control device and supplying the received switch operation signals to the control means, said control means controlling, in response to the switch operation signals of the second switches, operations of the embroidering machine corresponding to the control functions assigned to the second switches.

9. An embroidering machine as defined in claim 8 in which said remote control device is detachable from the embroidering machine main body and said second switches are constructed of switches which are common to a group of switches among the first switches having equivalent control functions, said switch group functioning as the first switches when the remote control device is attached to the embroidering machine main body and functioning as the second switches when the remote control device is detached from the embroidering machine main body.

* * * * *